(12) United States Patent
Hatton et al.

(10) Patent No.: US 9,987,816 B2
(45) Date of Patent: Jun. 5, 2018

(54) BANNER MAKING MACHINE

(71) Applicant: E.L. HATTON SALES CO., Wellington, OH (US)

(72) Inventors: Richard J. Hatton, Wellington, OH (US); John William Puleo, Greenville, SC (US)

(73) Assignee: E.L. HATTON SALES CO., Wellington, OH (US)

( * ) Notice: Subject to any disclaimer, the term of this patent is extended or adjusted under 35 U.S.C. 154(b) by 696 days.

(21) Appl. No.: 14/573,579

(22) Filed: Dec. 17, 2014

(65) Prior Publication Data
US 2015/0266255 A1 Sep. 24, 2015

Related U.S. Application Data

(60) Provisional application No. 62/066,584, filed on Oct. 21, 2014, provisional application No. 61/955,327, filed on Mar. 19, 2014.

(51) Int. Cl.
*B31D 1/00* (2017.01)
*B26D 7/27* (2006.01)
(Continued)

(52) U.S. Cl.
CPC ............. *B31D 1/0087* (2013.01); *B26D 7/27* (2013.01); *B26D 9/00* (2013.01); *B26F 1/00* (2013.01);
(Continued)

(58) Field of Classification Search
CPC .......... B31D 1/0087; B26D 7/27; B26D 9/00; B26F 1/00; B26F 1/02; B29C 63/0026;
(Continued)

(56) References Cited

U.S. PATENT DOCUMENTS 1,410,900 A * 3/1922 Durr ....................... A43C 5/00
16/2.1
1,838,973 A * 12/1931 Wilder ................. A43D 100/02
227/15
(Continued)

OTHER PUBLICATIONS

International Preliminary Report on Patentability for corresponding PCT Application No. PCT/US2015/019552, dated Sep. 20, 2016.
(Continued)

*Primary Examiner* — Hemant M Desai
*Assistant Examiner* — Lucas Palmer
(74) *Attorney, Agent, or Firm* — Renner, Otto, Boisselle & Sklar, LLP.

(57) ABSTRACT

A machine for applying support members to opposing sides of opposing edges of a sheet material includes a support tab applicator assembly that applies a first portion of a support tab along a longitudinal edge of a first side of the sheet material, a support tab finisher assembly that applies a second portion of the support tab disposed opposite the first portion to a second side of the sheet material disposed opposite the first side, and a hole punch assembly that cuts a hole through the sheet material. The machine also may include a strengthening film applicator assembly that applies a strengthening film along a longitudinal length of the first side of the sheet material and/or across the support tab.

21 Claims, 40 Drawing Sheets

(51) Int. Cl.
| | |
|---|---|
| *B31F 5/00* | (2006.01) |
| *B31F 5/08* | (2006.01) |
| *B26D 9/00* | (2006.01) |
| *B26F 1/02* | (2006.01) |
| *B65H 35/06* | (2006.01) |
| *B26F 1/00* | (2006.01) |
| *B29C 63/00* | (2006.01) |
| *B44C 3/00* | (2006.01) |
| *B42C 7/00* | (2006.01) |
| *B42D 5/04* | (2006.01) |
| *B42F 3/00* | (2006.01) |
| *B42F 15/06* | (2006.01) |
| *B42F 21/04* | (2006.01) |
| *B65B 61/14* | (2006.01) |
| *G09F 17/00* | (2006.01) |

(52) U.S. Cl.
CPC ............ *B26F 1/02* (2013.01); *B29C 63/0026* (2013.01); *B31F 5/00* (2013.01); *B31F 5/08* (2013.01); *B42C 7/001* (2013.01); *B42D 5/046* (2013.01); *B42F 3/006* (2013.01); *B42F 15/066* (2013.01); *B42F 21/04* (2013.01); *B44C 3/00* (2013.01); *B65B 61/14* (2013.01); *B65H 35/06* (2013.01); *B65H 2301/51512* (2013.01); *G09F 17/00* (2013.01)

(58) Field of Classification Search
CPC ... B31F 5/00; B31F 5/08; B42C 7/001; B42D 5/046; B42F 3/006; B42F 15/066; B42F 21/04
USPC ........ 493/351, 116, 214, 343, 344, 375, 379
See application file for complete search history.

(56) References Cited

U.S. PATENT DOCUMENTS

| | | | | | |
|---|---|---|---|---|---|
| 2,069,600 | A | * | 2/1937 | Coleman | A47K 3/38 160/330 |
| 2,203,977 | A | * | 6/1940 | Bennett | B65H 35/0013 101/248 |
| 2,228,372 | A | * | 1/1941 | Skrebba | B26D 7/34 156/261 |
| 2,589,168 | A | * | 3/1952 | Vassar | B42F 3/006 206/527 |
| 2,609,043 | A | * | 9/1952 | Dubinsky | A47H 23/04 160/124 |
| 2,890,820 | A | * | 6/1959 | Pate | B42F 3/006 225/6 |
| 3,226,283 | A | * | 12/1965 | Villalon | B26D 7/34 156/522 |
| 3,245,859 | A | * | 4/1966 | Busk | B42F 19/00 156/216 |
| 3,328,854 | A | * | 7/1967 | Tombari | A44B 13/0082 135/119 |
| 3,457,815 | A | * | 7/1969 | Cahill | B26D 7/34 156/513 |
| 3,585,095 | A | * | 6/1971 | Shearhod | B29C 65/18 156/261 |
| 3,766,707 | A | | 10/1973 | Alexander | |
| 3,925,144 | A | * | 12/1975 | Lowe | B29C 69/005 156/518 |
| 4,083,570 | A | * | 4/1978 | Sugawara | F16J 15/123 277/597 |
| 4,183,779 | A | * | 1/1980 | Barber | B42F 21/00 156/361 |
| 4,310,379 | A | * | 1/1982 | Harrison | B26D 7/34 156/541 |
| 4,316,763 | A | * | 2/1982 | Jensen | B29C 65/02 156/513 |
| 4,504,336 | A | * | 3/1985 | Talalay | B42C 19/02 156/216 |
| 4,588,463 | A | * | 5/1986 | Barber | B31F 1/0029 156/200 |
| 4,662,770 | A | * | 5/1987 | Block | B42F 3/006 281/2 |
| 4,698,114 | A | * | 10/1987 | Lowe | B29C 66/4722 156/353 |
| 4,777,071 | A | * | 10/1988 | Liu | A44B 13/0082 428/120 |
| 4,822,446 | A | * | 4/1989 | Hansen | B42F 3/006 156/250 |
| 4,853,268 | A | * | 8/1989 | Hansen | B42F 3/006 24/67 AR |
| 4,906,503 | A | * | 3/1990 | De La Cruz | G09F 7/18 116/173 |
| 4,909,884 | A | * | 3/1990 | Wormser | B05B 15/0456 156/248 |
| 5,031,268 | A | * | 7/1991 | McCabe | F16B 21/088 16/2.1 |
| 5,111,868 | A | * | 5/1992 | Sawaya | A47H 13/01 16/87.2 |
| 5,180,461 | A | | 1/1993 | Widmann | |
| 5,277,722 | A | * | 1/1994 | Block | B29C 69/005 156/216 |
| 5,304,275 | A | * | 4/1994 | Lowe | B31F 5/085 156/202 |
| 5,415,915 | A | * | 5/1995 | Oh | A44B 13/007 135/119 |
| 5,424,107 | A | * | 6/1995 | Lee | B68F 1/00 428/137 |
| 5,512,347 | A | * | 4/1996 | Chu | A44B 13/0082 135/119 |
| 5,522,165 | A | * | 6/1996 | Molla | G09F 17/00 40/604 |
| 5,560,384 | A | * | 10/1996 | Oh | E04H 15/64 135/115 |
| 5,763,031 | A | * | 6/1998 | Huang | D06N 7/00 139/384 R |
| 6,124,017 | A | * | 9/2000 | Sokol, Jr. | B32B 3/08 428/137 |
| D432,010 | S | * | 10/2000 | Etzel | D9/415 |
| 6,206,070 | B1 | * | 3/2001 | Salmon | B26D 7/34 156/251 |
| 6,495,238 | B1 | * | 12/2002 | Campbell | G09F 17/00 114/219 |
| 2002/0100856 | A1 | * | 8/2002 | Hatton | B42F 15/066 248/683 |
| 2002/0178569 | A1 | * | 12/2002 | Lucas | A41H 37/02 29/432.2 |
| 2003/0167610 | A1 | * | 9/2003 | Kopatz | A41H 37/02 24/713.7 |
| 2009/0000168 | A1 | * | 1/2009 | Campbell | G09F 17/00 40/604 |
| 2009/0205166 | A1 | * | 8/2009 | Murray | A47H 23/01 16/221 |
| 2016/0236399 | A1 | * | 8/2016 | Nussbaum | G09F 17/00 |
| 2016/0236404 | A1 | * | 8/2016 | Nussbaum | B29C 65/72 |

OTHER PUBLICATIONS

Invitation to Pay Additional Fees and, Where Applicable, Protest Fee and Partial International Search Report; Application No. PCT/US2015/019552, dated Jun. 23, 2015.

International Search Report and Written Opinion for corresponding PCT Application No. PCT/US2015/019552, dated Aug. 26, 2015.

* cited by examiner

BANNER MAKING MACHINE

RELATED APPLICATIONS

This application claims the benefit of U.S. Provisional Application No. 61/955,327, filed Mar. 19, 2014, and U.S. Provisional Application No. 62/066,584, filed Oct. 21, 2014, which are hereby incorporated herein by reference in their entirety.

FIELD OF INVENTION

The present invention relates generally to a machine for applying tab supports to a sheet material, and more particularly to a machine for modifying a sheet material for being suspended as a banner.

BACKGROUND

Banners provide a means for communication by way of advertising and the like. Banners are typically suspended, such as hung, displayed and/or stretched taut, by means of suspension members, such as rods, tubes, poles, rope, twine, string, etc., received by the banner, such as in a support member, such as grommets and the like, so as to be easily and readily visible.

Various methods have been used to convert a sheet material into a banner able to be suspended. Edge portions of a sheet material have been overlapped and sewn, stitched or hot air welded to create a pocket for receiving a suspension member. Grommets have been punched into the sheet material or attached to the material via tape or hot air welding. These methods, however, suffer drawbacks of at least one of high equipment cost, high production time, high skill necessary for production, high labor cost, high power requirements, large production floor footprint, low production volume and/or variable strength of the end product when suspended.

SUMMARY OF INVENTION

A banner making machine is provided for overcoming one or more of these drawbacks, by fabricating banners using relatively lower labor costs, lower power requirements, and lower production time while also having a more consistent strength of the end product when suspended.

More specifically, the present disclosure provides a machine for applying support members to opposing sides of opposing edges of a sheet material. The machine includes a support tab applicator assembly that applies a first portion of a support tab along a longitudinal edge of a first side of the sheet material, a support tab finisher assembly that applies a second portion of the support tab, which is preferably disposed opposite the first portion, to a second side of the sheet material, which is preferably disposed opposite the first side, and a hole punch assembly that cuts a hole through at least the sheet material. The machine may also include a strengthening film applicator assembly that applies a strengthening film along a longitudinal length of the first side of the sheet material and/or across the support tab.

The resulting modified sheet material includes support tabs spaced apart along oppositely disposed longitudinal edges wherein the support tabs have a first portion applied to a first side of the sheet material and a second portion disposed opposite the first portion applied to a second side of the sheet material disposed opposite the first side, and holes extending through the sheet material and the support tabs wherein the holes extend from the first side to the second side. The resulting modified sheet material may also include a strengthening film applied along the oppositely disposed longitudinal edges, wherein the strengthening film may be applied across the support tabs, and wherein the holes may extend through the strengthening film.

In other embodiments, affixation of the tabs to the banner may be effected by grommets instead of strengthening film, or by a combination of strengthening film and grommets. In still other embodiments, tabs may be omitted and one or more of strengthening film or grommets may be used.

According to one aspect of the disclosure, a machine for applying support tabs to a sheet material includes a support tab applicator assembly that engages a first side of a sheet material along a longitudinal length of the sheet material to apply a first portion of a support tab thereto, the support tab being configured to receive a suspension member. The machine further includes a support tab finisher assembly that engages a second side of the sheet material along the longitudinal length to apply a second portion of the support tab thereto opposite the first portion of the support tab, and a hole punch assembly that cuts a hole through the sheet material, the hole for receiving the suspension member.

The machine may further include a strengthening film applicator assembly that engages the sheet material and/or the support tab to apply a strengthening film along the longitudinal length of the sheet material and/or across the support tab.

The machine may further include a first support tab applicator assembly, first support tab finisher assembly, and first hole punch assembly configured for modifying a first longitudinal edge portion of the sheet material, and a second support tab applicator assembly, second support tab finisher assembly, and second hole punch assembly configured for modifying a second longitudinal edge portion of the sheet material disposed opposite the first longitudinal edge portion.

The machine may further include a support table that supports the sheet material during tab application, the support table including a table edge for supporting a longitudinal edge portion of the sheet material, and the table edge having extending therethrough a gap for exposing oppositely disposed areas on the first and second sides of the sheet material, thereby allowing the support tab to be applied to the oppositely disposed areas.

The machine may further include a controller configured to recognize a longitudinal location of the support tab along the longitudinal length of the sheet material.

The machine may further include a sheet material advancing assembly including a grasping portion that grasps a longitudinal edge portion of the longitudinal length of the sheet material, and a channel along which the grasping portion moves to advance the sheet material along the machine.

The support tab applicator assembly may include a selectively retractable support tab dispenser that dispenses a support tab and advances the support tab towards the first side of the sheet material.

The support tab finisher assembly may include a first actuator that pushes the second portion of the support tab into a nonplanar position relative to the sheet material, and a second actuator that pushes the second portion of the support tab from the nonplanar position to a final position applied to the second side of the sheet material where the first portion is arranged substantially parallel the second portion in the final position.

The strengthening film applicator assembly may include oppositely disposed members that engage the strengthening film prior to application of the film to the sheet material and that disengage the strengthening film during application of the film to the sheet material.

The machine may have a sheet plane aligned through the sheet material, a bisecting plane aligned orthogonal to the sheet plane and bisecting the longitudinal length of the sheet material, and transverse plane aligned orthogonal to each of the sheet plane and the bisecting plane, and wherein the machine includes a severing mechanism for severing a length of strengthening film, the blade being disposed in a blade plane aligned at an acute angle to each of the sheet plane and the bisecting plane and aligned orthogonal to the transverse plane.

The machine may further include a support table to support the sheet material during application of the support tabs, and a retractable pressure support to support a portion of the second side of the sheet material disposed opposite a portion of the first side of the sheet material to which the support tab applicator assembly applies the first portion of the support tab, and wherein the pressure support is configured to retract, disengaging it from the second side of the sheet material upon application of the second portion of the support tab to the second side of the sheet material.

The support tab applicator assembly may include a roll mechanism that receives a roll of support tabs.

The roll mechanism may include a roll of support tabs wound about a center axis.

The hole punch assembly may be configured to apply a grommet to the sheet material, wherein the application of the grommet causes a hole to be punched through the sheet material.

According to another aspect of the disclosure, a machine for applying tab supports to a sheet material includes a support tab dispenser that dispenses support tabs and a support tab application actuator that applies the support tabs to a first side of the sheet material. The machine further includes an actuator assembly disposed downstream of the support tab dispenser and support tab application actuator to apply each respective support tab to a second side of the sheet material disposed opposite the first side, wherein the actuator assembly includes a first actuator that pushes the second portion of each respective support tab into a nonplanar position relative to the sheet material. A second actuator pushes the second portion of the support tab from the nonplanar position to a position applied to the second side of the sheet material where the first portion is arranged substantially parallel the second portion. A hole punch disposed downstream of the actuator assembly punches a hole through a portion of the sheet material enclosed by each respective support tab, thereby creating holes for receiving suspension members for suspending the sheet material.

The machine may further include a strengthening film dispenser that applies a strengthening film along the sheet material and across a selection of the support tabs, wherein the strengthening film dispenser is disposed downstream of the actuator assembly.

The strengthening film dispenser may be disposed upstream of the hole punch.

The support tab dispenser, support tab application actuator, actuator assembly, and hole punch may be disposed along a first side of the machine and are configured to modify a first longitudinal edge portion of the sheet material, wherein the machine further includes a second support tab dispenser, second support tab application actuator, second actuator assembly, and second hole punch disposed along a second side of the machine disposed opposite the first side and are configured to modify a second longitudinal edge portion of the sheet material disposed opposite the first longitudinal edge portion.

The machine may further include a grasping portion that grasps the sheet material, and a channel along which the grasping portion translates along a direction parallel to the longitudinal length of the sheet material, wherein the grasping portion moves between the support tab dispenser and the hole punch.

According to yet another aspect of the application, a method of applying support tabs to a sheet material includes the steps of actuating an actuator to apply first portions of support tabs to a first side of the sheet material along a longitudinal length of the sheet material, each support tab for receiving a suspension member. The method also includes actuating a second actuator to fold a second portion of each respective support tab under the sheet material and applying the second portion of each respective support tab to a second side of the sheet material disposed opposite the first side.

The method further includes actuating a punch to cut holes through a portion of the sheet material disposed between respective first and second portions of the support tabs, the holes for receiving suspension members for suspending the sheet material.

The method may further include the step of applying a strengthening film along the sheet material and across a selection of the support tabs.

The applying a strengthening film along the sheet material and across a selection of the support tabs may occur simultaneously with actuating an actuator to apply first portions of support tabs to a first side of the sheet material along a longitudinal length of the sheet material.

The actuating an actuator to apply first portions of the support tabs to a first side of the sheet material may occur simultaneously at two oppositely disposed longitudinal edge portions of the sheet material.

According to still another aspect of the application, a machine for applying strengthening materials to a sheet material includes a strengthening film applicator assembly that engages the sheet material to apply a strengthening film along the longitudinal length of the sheet material and/or across the support tab, wherein the strengthening film applicator assembly includes oppositely disposed members that engage the strengthening film prior to application of the film to the sheet material and that disengage the strengthening film during application of the film to the sheet material and a hole punch assembly that punches a hole through the sheet material and the strengthening film to create holes for receiving suspension members for suspending the sheet material.

The machine may have a sheet plane aligned through the sheet material, a bisecting plane aligned orthogonal to the sheet plane and bisecting the longitudinal length of the sheet material, and transverse plane aligned orthogonal to each of the sheet plane and the bisecting plane, and the machine may include a severing mechanism for severing a length of strengthening film, the blade being disposed in a blade plane aligned at an acute angle to each of the sheet plane and the bisecting plane and aligned orthogonal to the transverse plane.

The strengthening film applicator assembly may be disposed upstream of the hole punch.

The machine may further include a support tab applicator assembly that dispenses support tabs and that applies the support tabs to a side of the sheet material wo which the strengthening film applicator assembly applies the strengthening film.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

The present invention generally provides a banner making machine and associated method for applying support tabs to a sheet material. The machine is easy to load, requires minimal power, requires minimal labor, adjusts for fabricating various sized banners, and is configured to produce numerous banners per minute.

The banner making machine is configured to fabricate a modified sheet material including support tabs spaced apart along oppositely disposed longitudinal edges wherein the support tabs have a first portion applied to a first side of the sheet material and a second portion disposed opposite the first portion applied to a second side of the sheet material disposed opposite the first side, and holes extending through the sheet material and the support tabs wherein the holes extend from the first side to the second side. The holes are provided to receive suspension members for use in suspending the banner.

The banner making machine may additionally or alternatively be configured to fabricate a modified sheet material including a strengthening film applied at least along the oppositely disposed longitudinal edges. The strengthening film may be applied across the support tabs or, in other embodiments, across the sheet material where support tabs are omitted. Holes punched by the banner making machine may extend through the strengthening film in any of the embodiments.

In still further embodiments, the banner making machine may additionally or alternatively be configured to fabricate a modified sheet material including grommets punched through any combination of the sheet material, support tabs, and strengthening film.

While the machine may be used to fabricate banners, the machine is not limited only to the fabrication of banners. The machine also may be used for applying support tabs, strengthening film, and/or grommets to any suitable sheet material, such as canvas, plastic, fabric, etc. Other applications include fabrication of any product for being suspended, including for being displayed, hung and/or stretched taut and may include tarpaulins, curtains, hanging barriers, etc.

Figure 1:
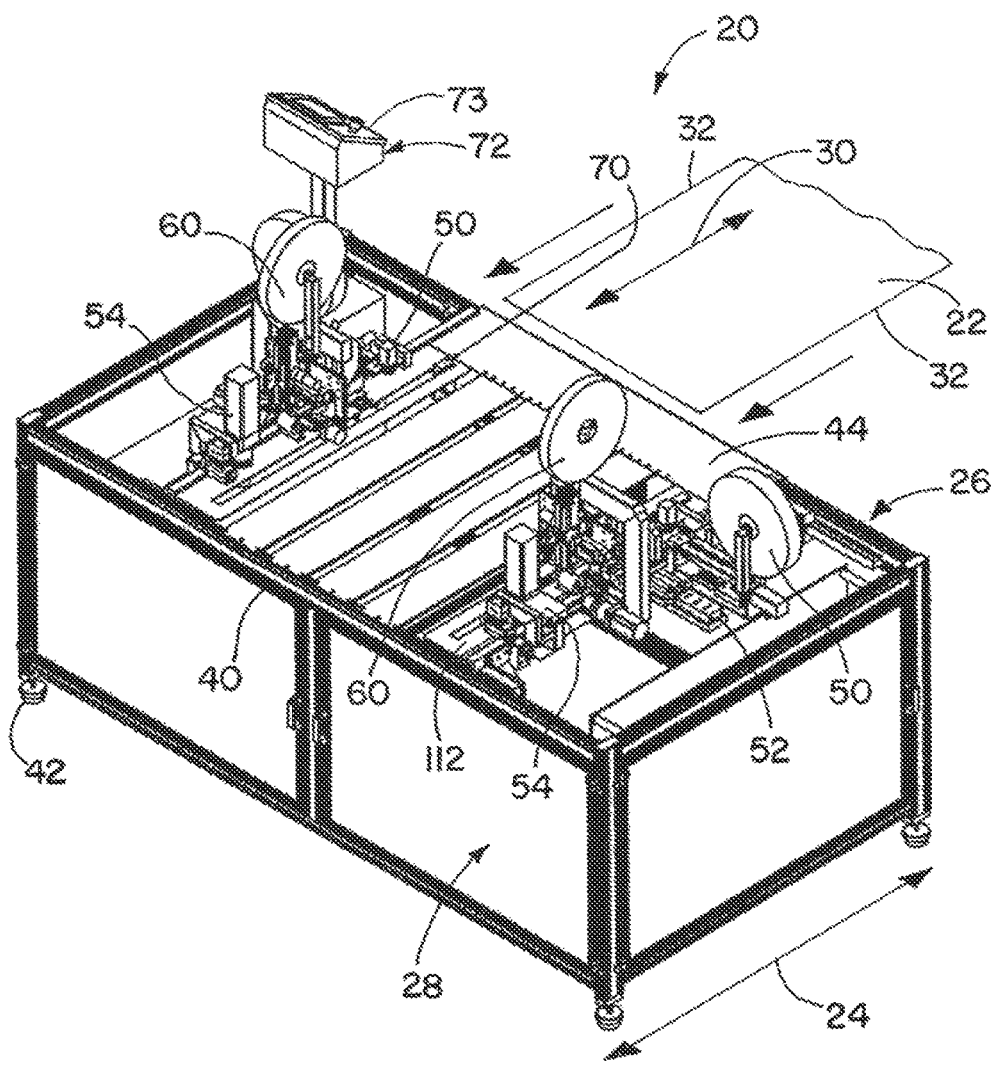
FIG. 1 is a rear oblique view of an exemplary banner making machine provided in accordance with the present invention.
Figure 2:
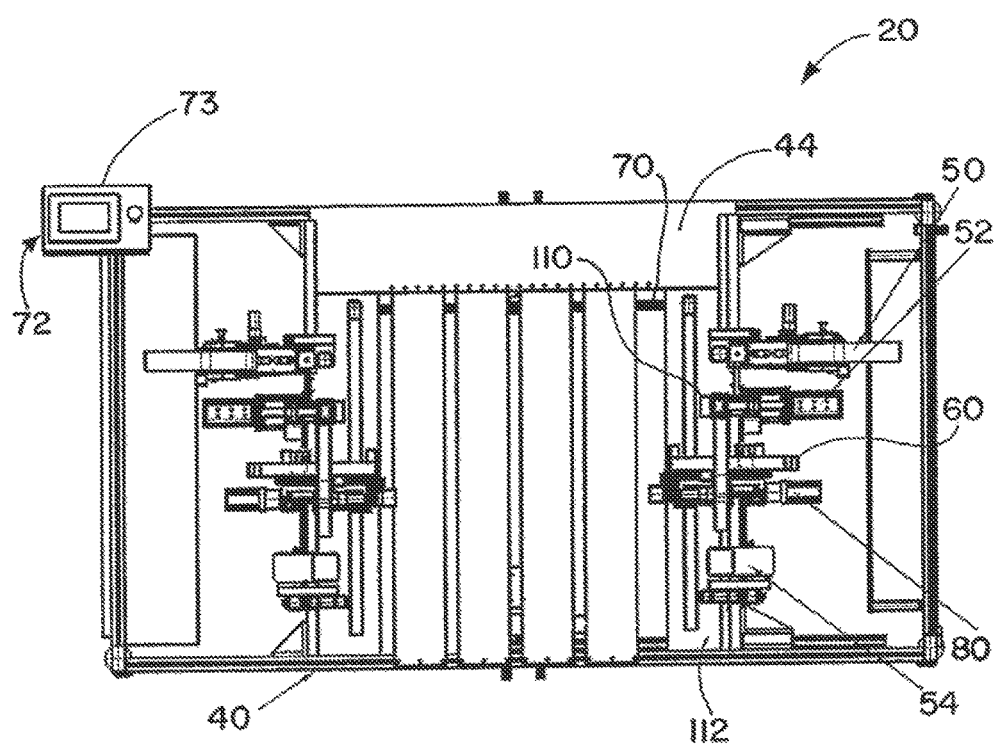
FIG. 2 is a top view of the exemplary banner making machine of FIG. 1.
Figure 3:
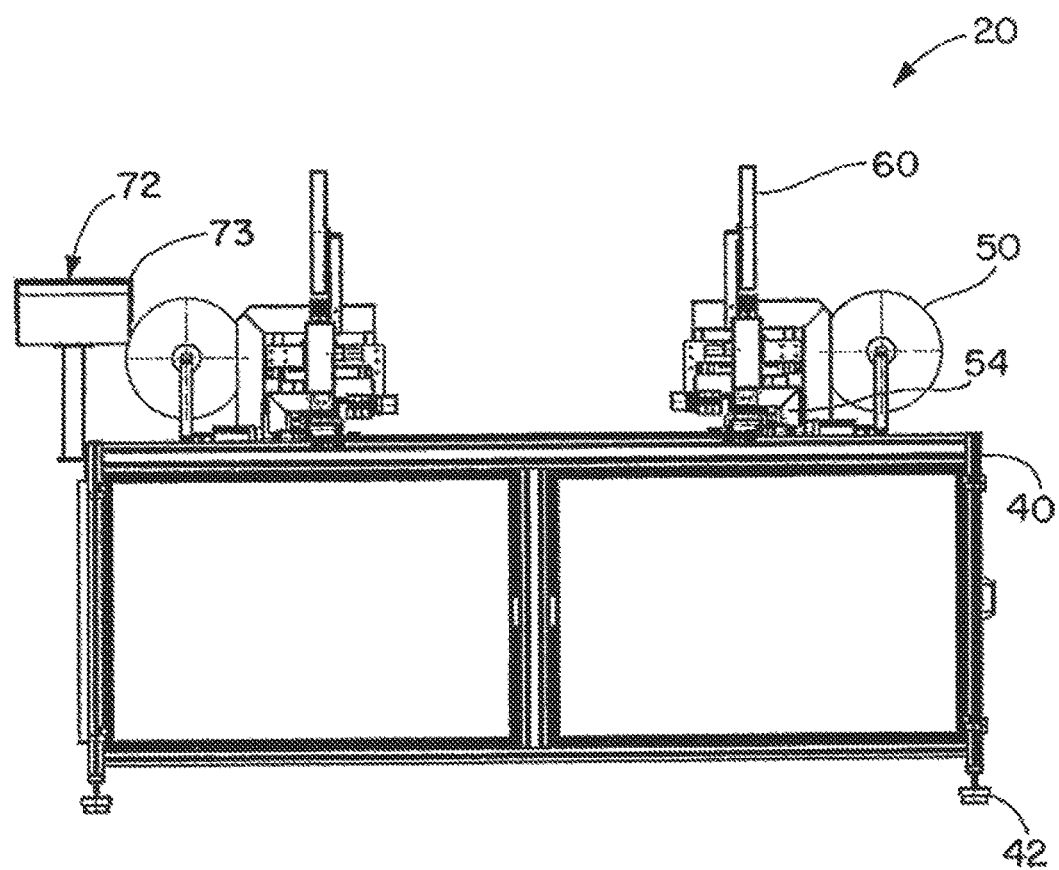
FIG. 3 is a rear view of the exemplary banner making machine of FIG. 1.
Figure 4:
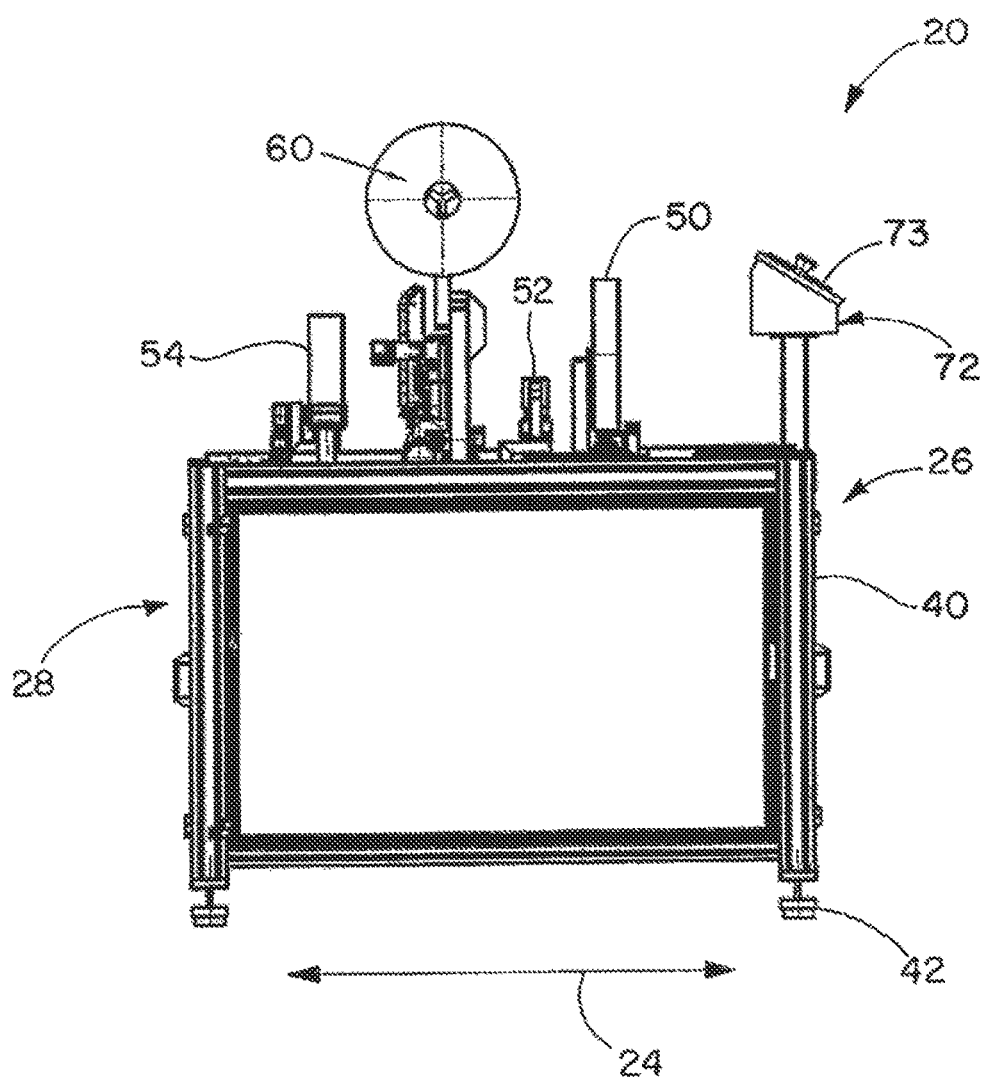
FIG. 4 is a side view of the exemplary banner making machine of FIG. 1.
Figure 5:
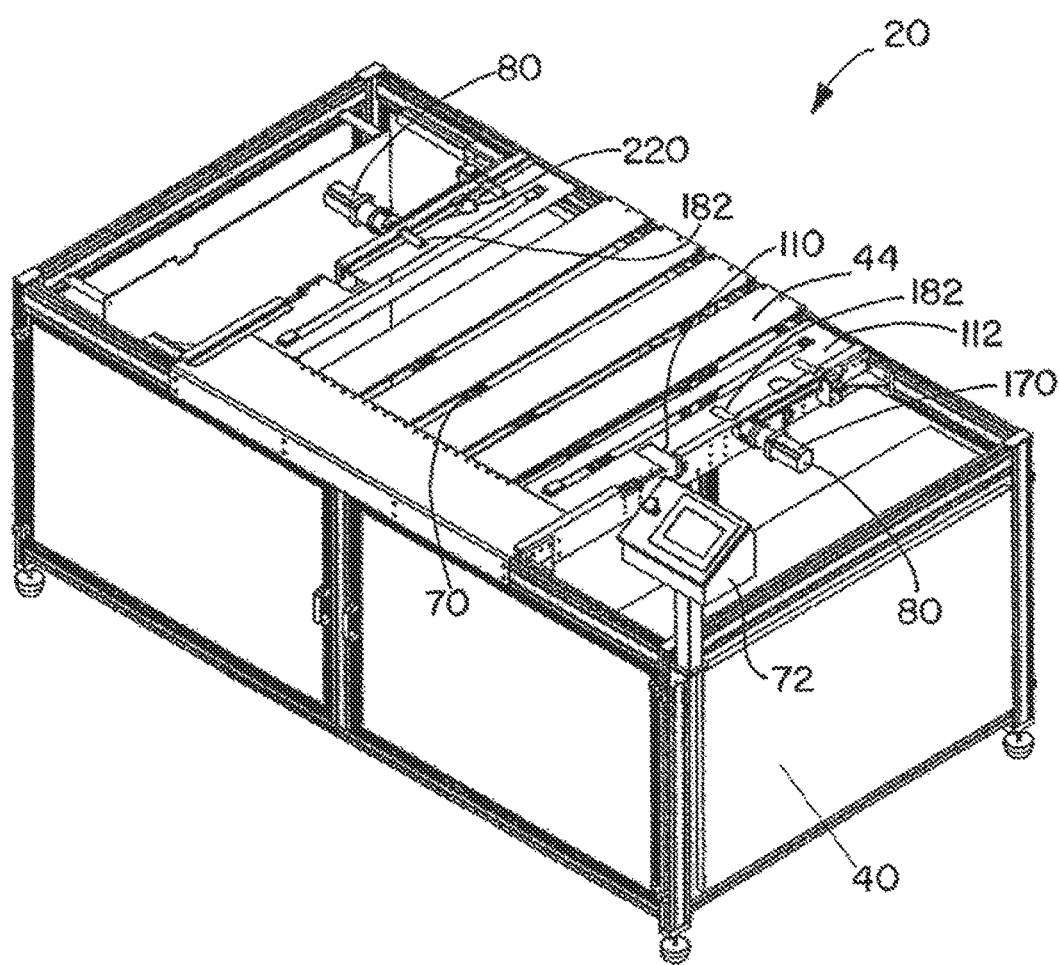
FIG. 5 is a front oblique view of the exemplary banner making machine of FIG. 1.
Figure 6:
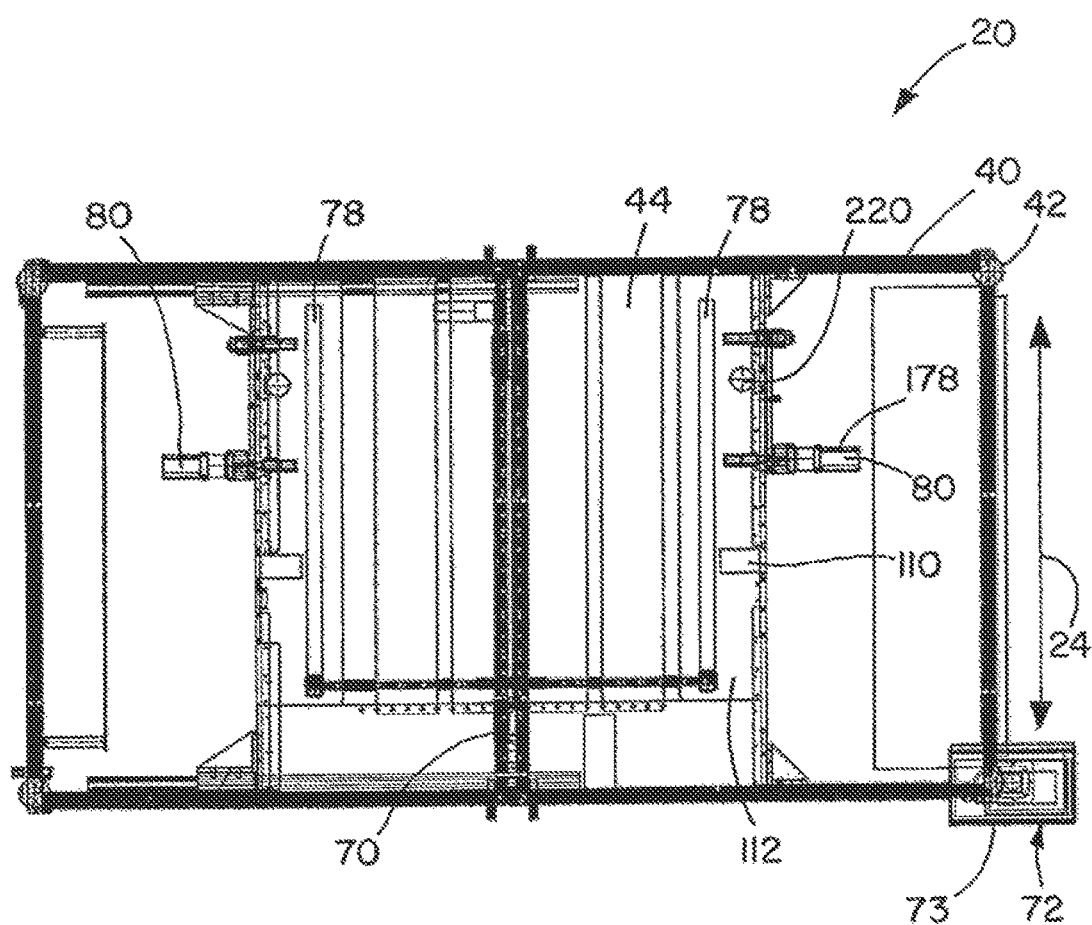
FIG. 6 is a bottom view of the exemplary banner making machine of FIG. 1.

Referring now to the drawings in detail, and initially to FIG. 1, an exemplary banner making machine 20 is provided for modifying a sheet material 22 (also shown separately in FIGS. 13, 21, 29 and 35). The machine 20 is configured to apply support tabs to the sheet material 22 to form a modified sheet material final product. In the depicted embodiment, the final product is a banner, though the final product may be any other modified sheet material that has been modified for being suspended.

The sheet material 22 may be provided as discrete lengths into the machine 20. In other embodiments, the sheet material 22 may be provided as one or more rolls or as one or more stacks of fan-folded sheet material 22 to be cut into discrete lengths.

The illustrated banner making machine 20 is configured to move the sheet material 22 along a longitudinal work length 24 of the machine 20. The longitudinal work length 24 extends from a front end 26 to a rear end 28 of the machine 20. Along the work length 24, the machine 20 completes, and preferably automatically completes, one or more steps. These steps are completed along a longitudinal length 30 of the sheet material 22, as the sheet material 22 passes through the machine 20 with the material's longitudinal length 30 aligned substantially parallel with the machine's longitudinal work length 24.

The first step completed along the longitudinal length 30 of the sheet material is (a) the application of the support tabs. In a preferred embodiment, the support tabs are applied along longitudinally-extending free edges 32 of the sheet material 22, to oppositely disposed top and bottom sides of the sheet material 22. In other embodiments, the support tabs may only be applied to one of the top side or the bottom side of the sheet material 22.

The illustrated support tabs (see, e.g., FIG. 13) are made of plastic, such as polycarbonate, polyvinyl, low density polyethylene, high density polyethylene, woven polyethylene, polypropylene, polyester film, etc. In other embodiments, the support tabs may be made of any suitable material such as fabric, mesh material, ribbed material, Kevlar, metal, canvas, high-strength tag board, etc.

As further described below, the support tabs may include adhesive disposed against a support tab backing material. The adhesive may enable a relatively strong attachment between the support tabs and the banner sheet material 22, and may be resistant to aging and to the elements, such as temperature extremes, rapid temperature changes, moisture, freezing, etc.

In addition to applying support tabs, some embodiments of the machine 20 are configured for (b) application of a strengthening film. The strengthening film is applied over the sheet material, and also may be applied over the support tabs, to strengthen the attachment of the support tabs to the sheet material and/or to strengthen the sheet material. The machine 20 may be configured to apply strengthening film over only a selection of the support tabs, or alternatively over each of the support tabs.

The illustrated strengthening film (see, e.g., FIG. 28) is a plastic tape, preferably having high tensile strength and high tear strength. A preferred embodiment of the strengthening film also has an adhesive that, along with a backing material against which the adhesive is disposed, is substantially resistant to aging and to the elements, such as temperature extremes, rapid temperature changes, moisture, freezing, etc. Other embodiments of the machine 20 may be configured to apply other suitable strengthening films having different combinations of suitable properties.

In some embodiments of the machine 20, including the illustrated embodiment, the machine 20 may be configured for completing a step of (c) punching of holes through at least the sheet material 22. The holes are provided for receiving suspension members, such as rods, tubes, poles, rope, twine, string, etc. for suspending the final banner product.

Holes may be punched through one or both of the support tabs and the strengthening film. While the depicted support tabs have a hole extending from a first side to an oppositely disposed second side, other support tabs may not have holes, and thus the machine 20 may be configured to punch holes through multiple materials to finalize the modified sheet material.

It will be appreciated that the steps of (a) applying support tabs, (b) applying strengthening film, and (c) punching holes may be completed in any suitable order. For example, strengthening film may be applied prior to application of support tabs, or the strengthening film may be applied but the support tab application may be omitted. Thus it will also be appreciated that one or more of the steps (a)-(c) may be omitted. Other steps may be included, additionally or alternatively, such as grommet punching, etc., and the other steps may be used in combination with any selection of the steps (a)-(c).

A modified sheet material final product (see, e.g. FIG. 35) created by the completion of a selection of the many steps may be relatively stronger than sheet materials modified by other methods such as using sewing or heat welding. The combination of the sheet material, support tabs and strengthening film may provide areas of relatively large tensile and tear strength as compared to the remainder of the final product, for resisting external forces acting on the final product while suspended. The external forces may include tension in the material caused by the suspension itself and other forces such as wind.

Additionally, a final product including the strengthening film may provide greater strength than a final product not including the strengthening film. This is because use of the strengthening film may spread forces applied to the final product over the area of the film, rather than merely spreading the forces over the area of the support tabs.

The banner making machine 20 is configured to fabricate the modified sheet material final products relatively quickly, thus providing a relatively low production time per banner and as a result, a relatively high production volume. By including automated assemblies for one or more of (a) application of the support tabs, (b) application of the strengthening film, and (c) punching of the holes, the machine 20 may enable fabrication of multiple banners per minute, such as 1 to 10 banners per minutes, more preferably 1 to 5 banners per minute, and even more preferably 2 banners per minutes, for example. Thus the machine 20 may enable fabrication of 200 banners per hour, for example, which preferably may amount to greater than 1000 banners in an eight hour shift. Use of automated assemblies also enables the use of a single operator and the skill level of the operator may be relatively lower than that required for other conventional methods, such as sewing or hot air weld operations. In this way, the machine 20 may allow for relatively low labor cost.

The banner making machine 20 also provides the benefit of a relatively small footprint as compared to other methods, such as sewing operations. The banner making machine 20 includes a fabrication frame 40 having adjustable support legs 42 supporting a fabrication table 44. Numerous automated assemblies, also herein referred to as modules, are coupled to the fabrication table 44 for modifying a sheet material, such as the sheet material 22. The frame 40 may be relatively small, such as the size of a conventional desk, thus taking up minimal production floor space, and making the machine 20 easily movable about the production floor. Alternatively, the machine 20 may be of any suitable size for modifying a sheet material 22.

The illustrated frame 40 is adjustable to accommodate sheet materials of various widths within the frame dimensions. The various widths of the sheet materials being modified by the machine 20 may be about 12 inches to 60 inches wide, and more preferably 18 inches to 48 inches wide.

In other embodiments, the frame 40 may include modular portions that are separable from one another to enable modification of sheet materials having larger dimensions, such as a sheet material having a width of about 5 foot to 50 foot, or more preferably about 10 foot.

The illustrated automated assemblies attached to the frame 40 of the banner making machine 20 include a support tab applicator assembly 50 that initiates application of support tabs to the sheet material 22, a support tab finisher assembly 52 that finishes application of the support tabs to the sheet material 22, and a hole punch assembly 54 that cuts holes through at least the sheet material 22 for receiving suspension members for suspending the modified sheet material final product. The illustrated machine 20 also includes a strengthening film applicator assembly 60 for applying the strengthening film to one or both of the sheet material 22 and the support tabs. The automated assemblies are coupled to the table 44 via clamping arms of the automated assemblies, though other suitable coupling components may be utilized.

A first set of automated assemblies—a support tab applicator assembly 50, a support tab finisher assembly 52, a hole punch assembly 54, and a strengthening film applicator assembly 60—are disposed side-by-side along a first side of the table 44 extending between the front end 26 and rear end 28 of the machine 20. A second set of automated assemblies is disposed opposite the first set along a second side of the machine 20, which is disposed opposite the first side of the machine 20. Each assembly of the first set is disposed opposite the same respective assembly of the second set, though other embodiments may include other arrangements.

The first set of assemblies acts on a first longitudinal edge of the sheet material 22, once it is loaded into the machine 20. The second set of assemblies acts on a second longitudinal edge of the sheet material 22, which is disposed opposite the first longitudinal edge.

In the illustrated embodiment, the assemblies are arranged in a particular order between the front end 26 and the rear end 28. The order is configured such that the banner making machine 20 first applies support tabs to the sheet material 22, then applies strengthening film, and then punches holes. Accordingly, the support tab applicator assembly 50 is disposed adjacent the front end 26, with the support tab finisher assembly 52 disposed downstream of the support tab applicator assembly 50. The strengthening film applicator assembly 60 is disposed downstream of the support tab finisher assembly 52, with the hole punch assembly 54 being disposed downstream of the support tab finisher assembly 52 and adjacent the rear end 28.

Alternatively, the automated assemblies may be arranged in any suitable order along the work length 24. For example, the strengthening film applicator assembly 60 may be disposed upstream of the support tab finisher assembly 52, instead of downstream of the support tab finisher assembly 52. In other embodiments, multiples of one or more of the automated assemblies may be included arranged along the first and or the second sides of the machine 20.

Referring now in greater depth to FIG. 1, and also to associated FIGS. 2 to 6, the banner making machine 20 will be further described. The machine 20 is configured to continuously fabricate the modified final product, once the sheet material 22 is loaded into the machine 20. The sheet material 22 may be loaded into a sheet material advancing assembly 70, to be discussed further. The advancing assembly 70 is configured for moving the sheet material 22 along the work length 24, in the downstream direction, between the front end 26 and rear end 28.

For example, once the table 44 is adjusted to the appropriate width for receiving the sheet material 22, the operator may simply position the sheet material 22 at the front end 26 of the machine 20 to begin the fabrication process. In such case, the illustrated machine 20 includes a controller 72 that senses that the sheet material 22 is in place and begins to fabricate the modified final product. Alternatively, the machine 20 may not automatically begin fabrication, and an operator may begin fabrication through use of the machine operator interface 73.

In the illustrated embodiment, the controller 72 is communicatively connected to each of the automated assemblies of the machine 20. The controller may be located at any suitable location of the machine 20. Further, the controller 72 may be configured to enable automated advancement of the sheet material 22 along the work length 24, such as by automatically operating the advancing assembly 70, or semi-manual advancement of the sheet material 22, such as by controlling the advancing assembly 70 via the machine operator interface 73.

Figure 7:
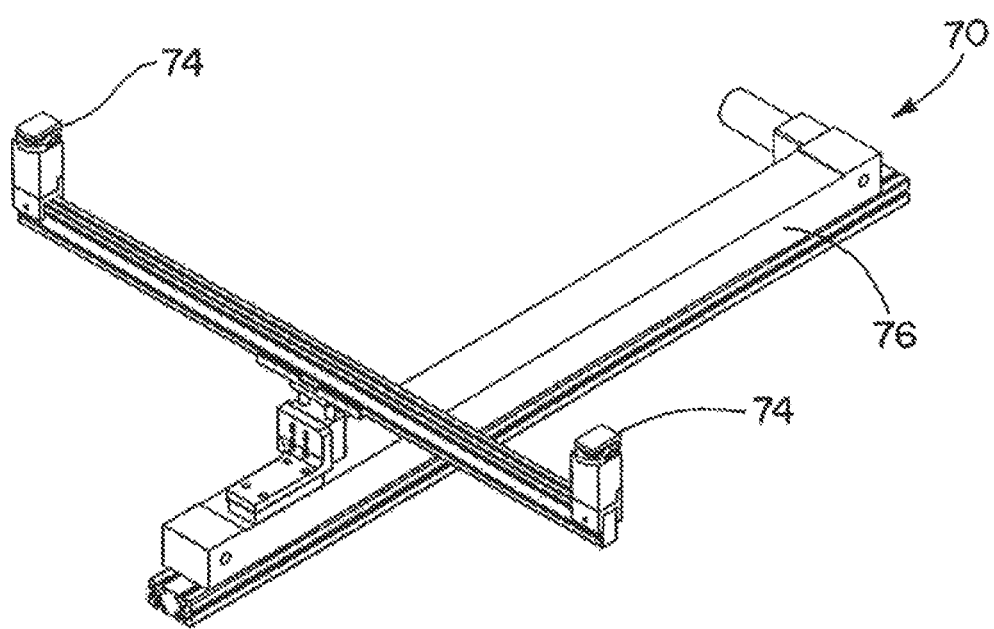
FIG. 7 is an oblique view of a pull assembly of the exemplary banner making machine of FIG. 1.
Figure 8:
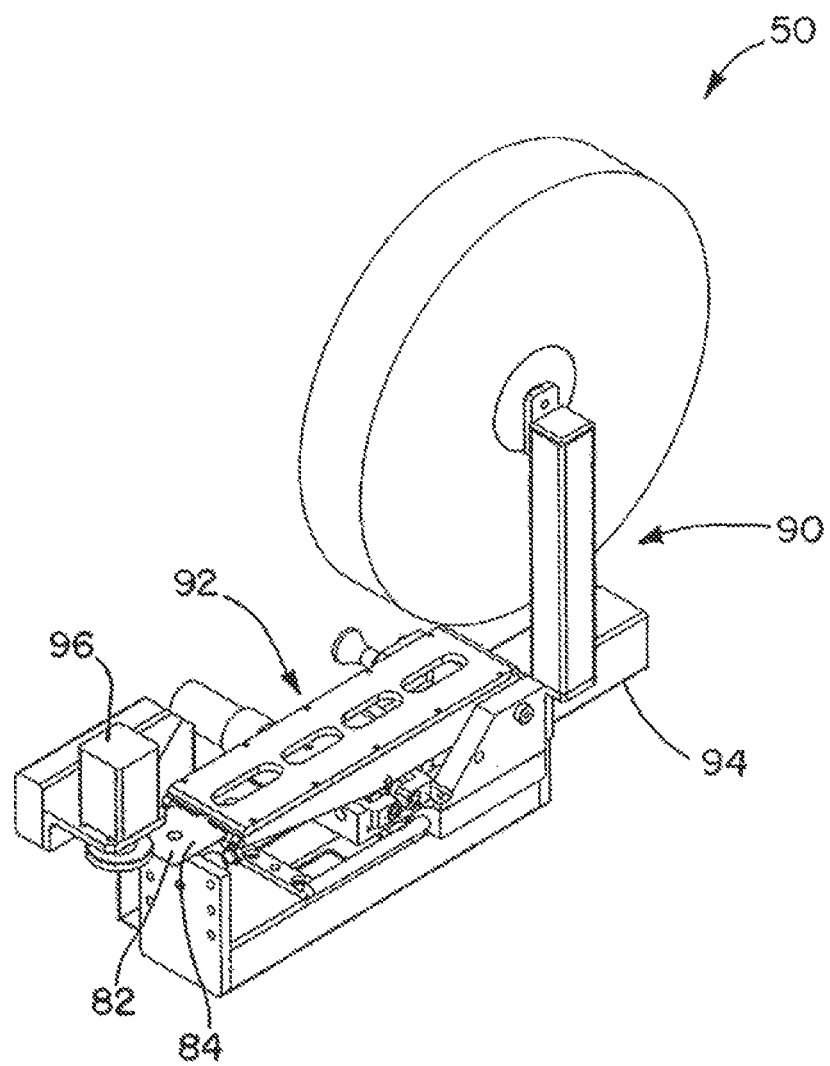
FIG. 8 is a front oblique view of a support tab applicator assembly of the exemplary banner making machine of FIG. 1
Figure 9:
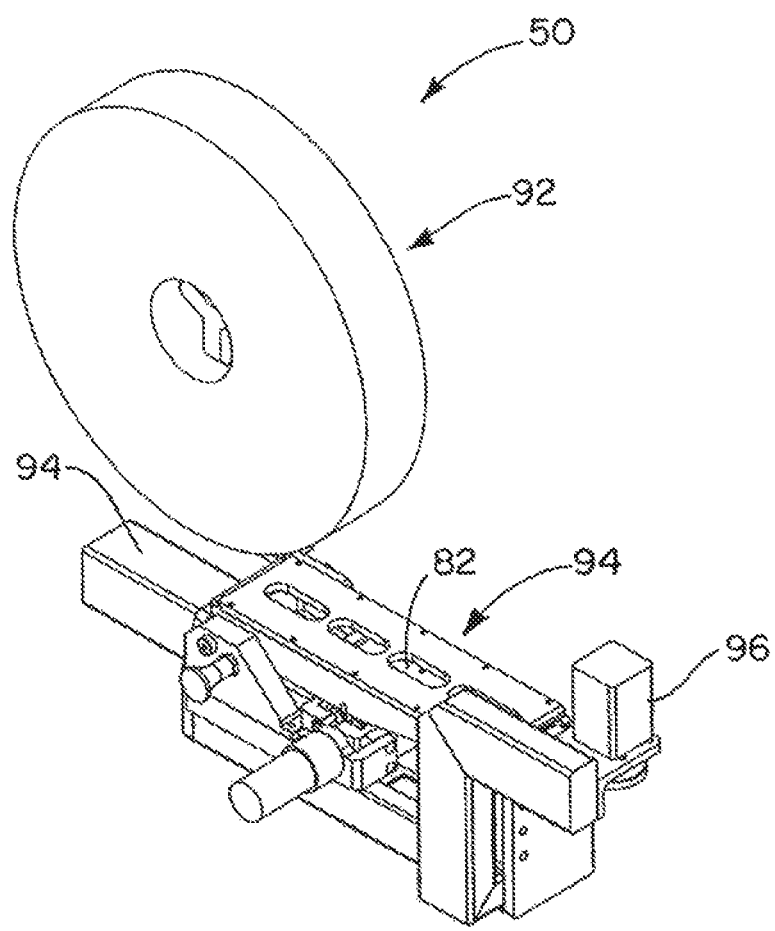
FIG. 9 is a rear oblique view of the support tab applicator assembly of FIG. 8.
Figure 10:
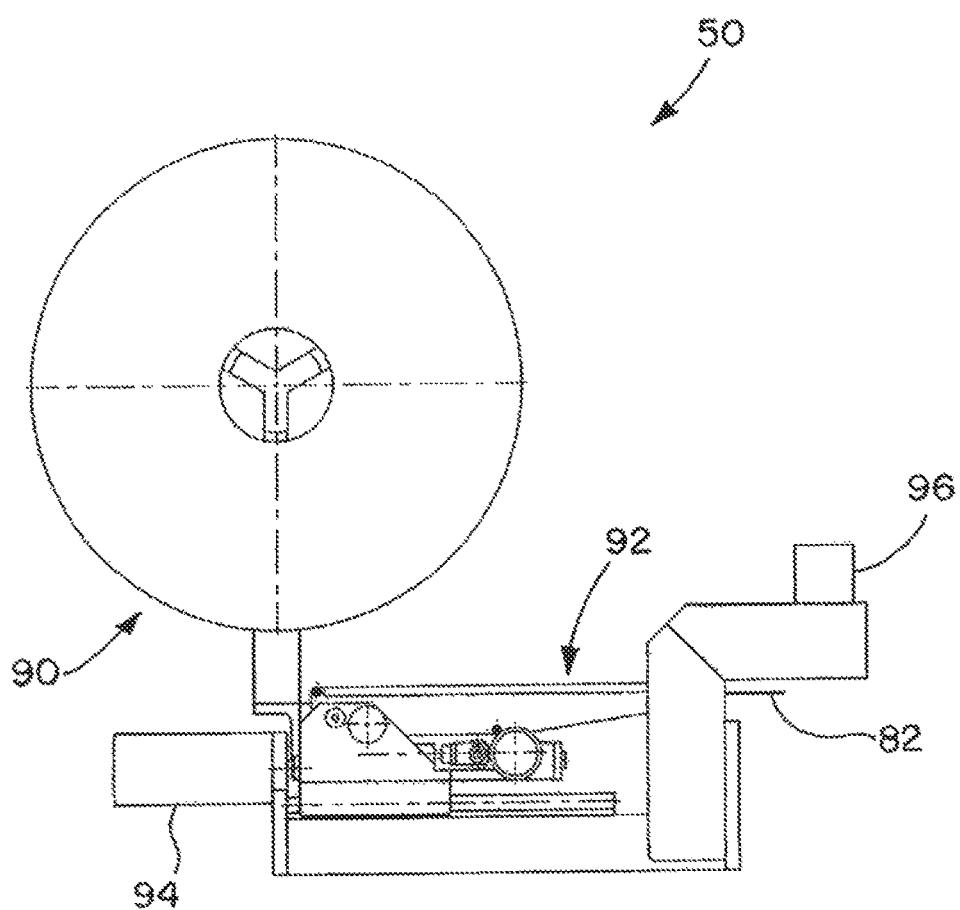
FIG. 10 is a front view of the support tab applicator assembly of FIG. 8.
Figure 11:
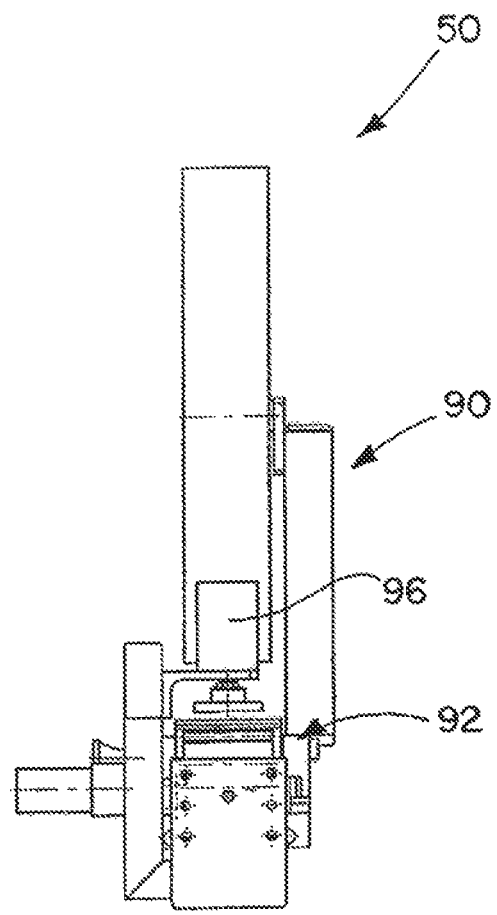
FIG. 11 is a side view of the support tab applicator assembly of FIG. 8.
Figure 12:
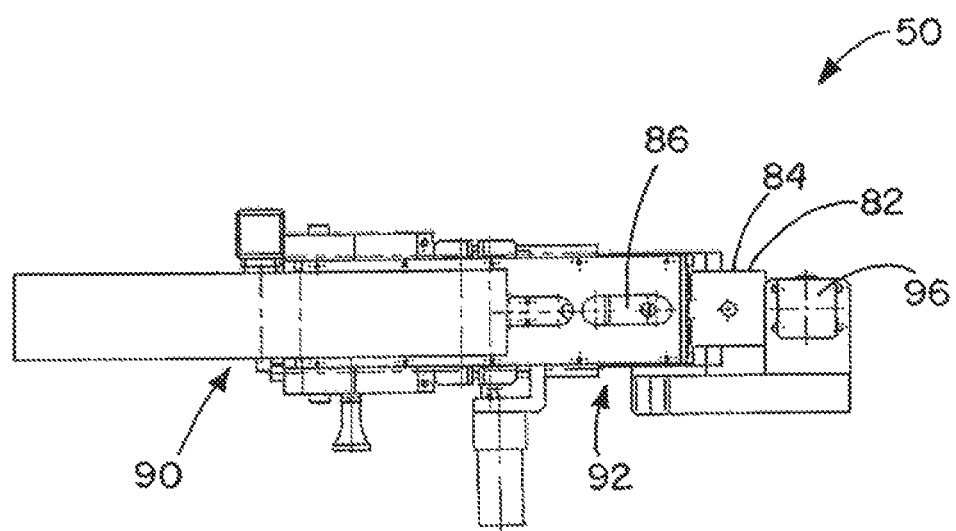
FIG. 12 is a top view of the support tab applicator assembly of FIG. 8.

Turning to FIG. 7, but also shown in each of FIGS. 1, 2, 5 and 6, the advancing assembly 70 is illustrated separate from the machine 20. The advancing assembly 70 may be coupled to the table 44. As herein used, coupling may include direct or indirect coupling between two components. The advancing assembly 70 includes a grasping portion 74 that grasps a lateral edge of the sheet material 22 disposed between the oppositely disposed longitudinal edges of the sheet material. The grasping portion 74 translates along a channel portion 76, which is coupled to the table 44, such as by fasteners, such as screws, bolts, etc. The grasping portion 74 translates between the front and rear ends 26 and 28, and thus between the support tab applicator assembly 50 and the hole punch assembly 54. As shown, the channel portion 76 is coupled to an underside of the table 44, while the grasping portion 74 extends through slots 78 (FIG. 6) in the table 44 to reach the sheet material 22.

To move the sheet material 22 from the front end 26 to the rear end 28, the grasping portion is translated along the channel portion 76, which extends substantially parallelly to the working length 24 of the machine 20. The sheet material 22 is also moved via the drive assembly 80 (FIGS. 5 and 6), which functions in cooperation with the strengthening film applicator assembly 60, discussed below.

Turning to FIGS. 8 to 13, after use of the advancing assembly 70, the banner making machine's fabrication process begins with the application of support tabs 82 simultaneously along both longitudinal edges of the sheet material 22 via the support tab applicator assembly 50. It will be appreciated that the controller 72 may be configured to skip application of one of a pair of support tabs 82, or even both of a pair of support tabs.

The support tab applicator assembly 50 for applying the support tabs 82 is shown separate from the frame 40. The support tab applicator assembly 50 is coupled to the table 44 and engages a first side of the sheet material 22 along a longitudinal length of the sheet material 22 to apply a first portion of support tabs thereto.

As herein used, engaging may include direct, contiguous contact or indirect engagement without direct contact. Note that the first side of the sheet material 22 is a side disposed opposite the table 44. The second side is disposed opposite the first side and faces, such as being in contact with, the table 44.

Once the advancing assembly 70 moves the sheet material to a location of a support tab 82 application, the support tab applicator assembly 50 is configured to apply a first portion of support tabs 82 to the first side of the sheet material 22. The support tab applicator assembly 50 is also configured to simultaneously leave a second portion of the support tabs 82 suspended from the sheet material 22 for application to the second side of the sheet material 22 by the support tab finisher assembly 54.

Figure 13:
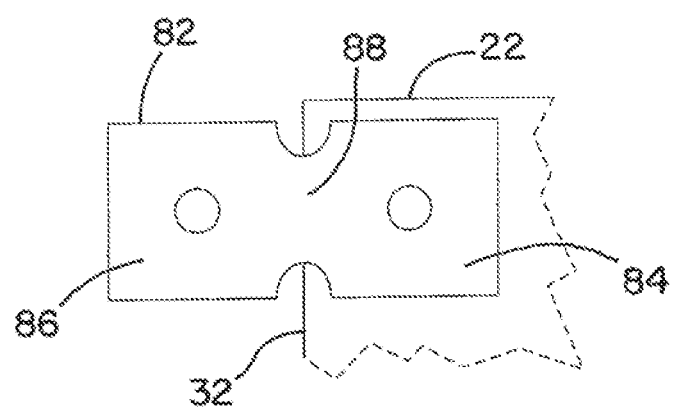
FIG. 13 is a partial top view of a sheet material showing a first portion of a support tab applied to the sheet material by the support tab applicator assembly of FIG. 8.
Figure 14:
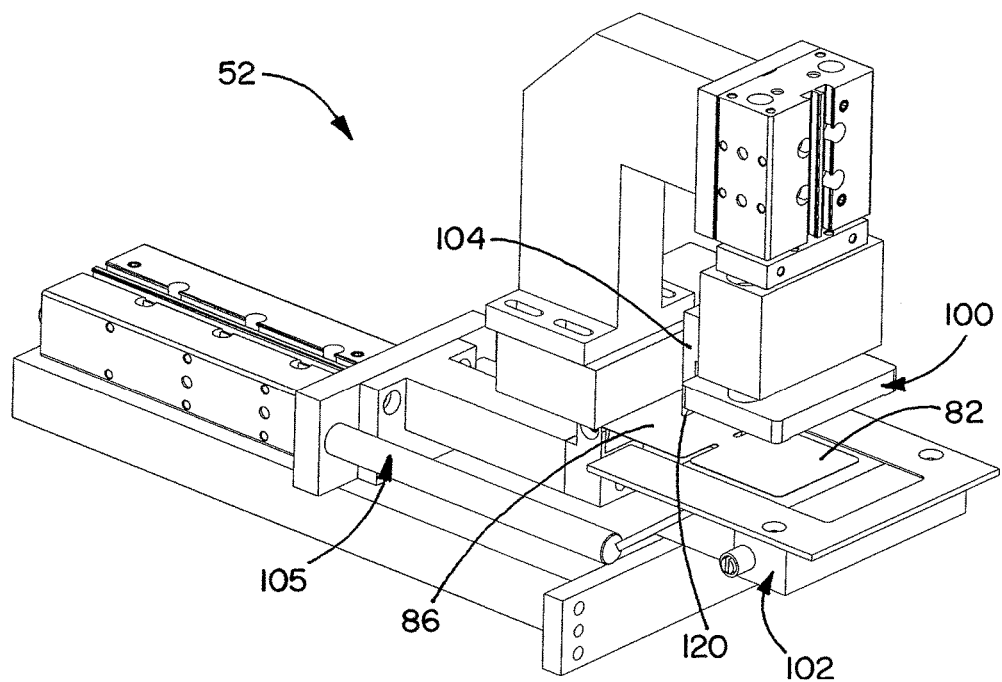
FIG. 14 is a front oblique view of a support tab finisher assembly of the exemplary banner making machine of FIG. 1.
Figure 15:
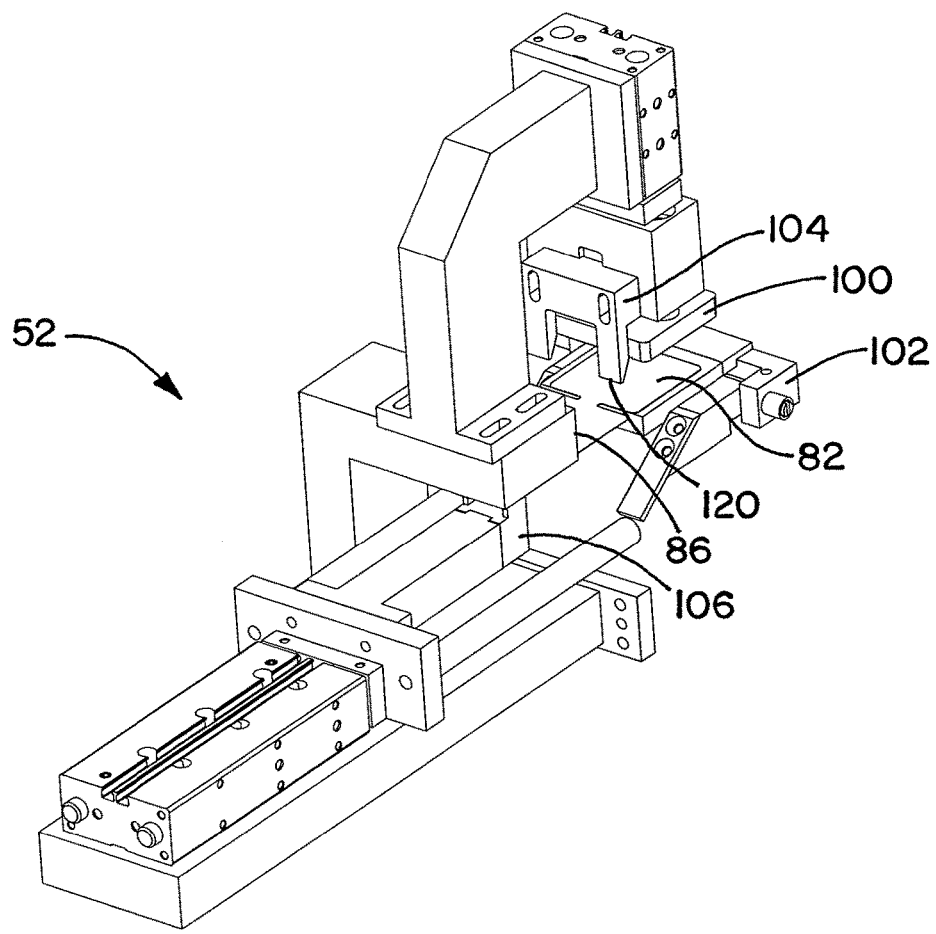
FIG. 15 is a rear oblique view of the support tab finisher assembly of FIG. 14.
Figure 16:
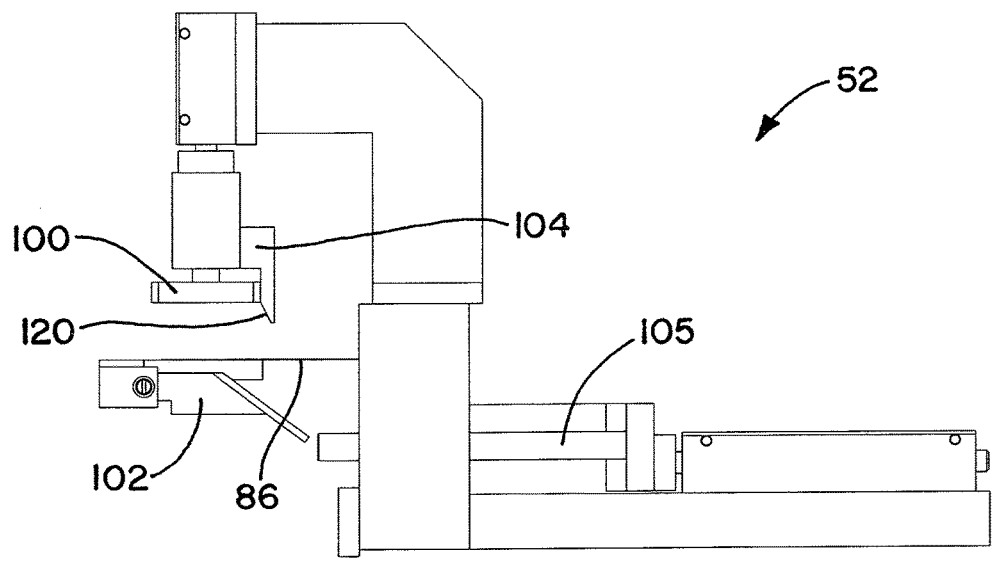
FIG. 16 is a side view of the support tab finisher assembly of FIG. 14.
Figure 17:
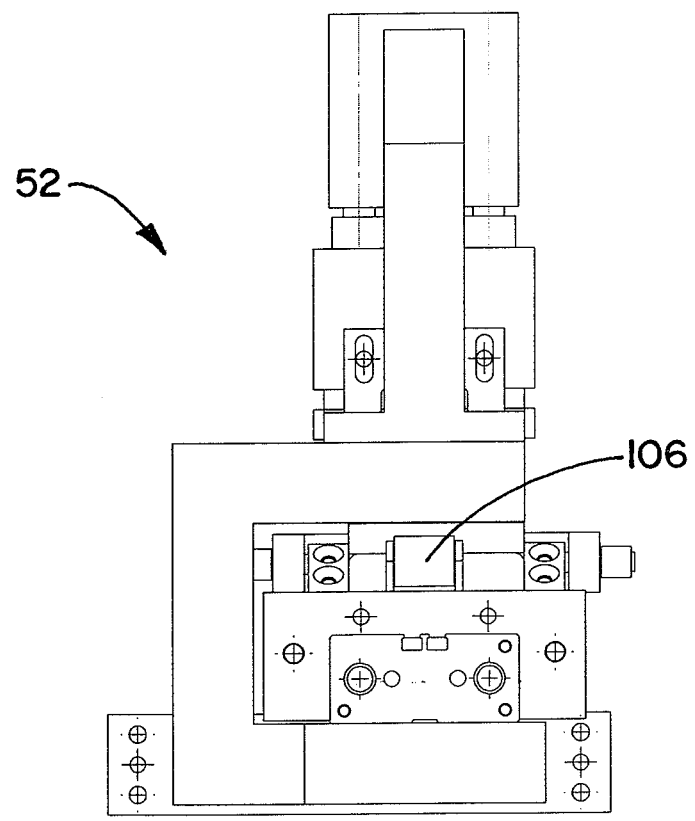
FIG. 17 is a front view of the support tab finisher assembly of FIG. 14.
Figure 18:
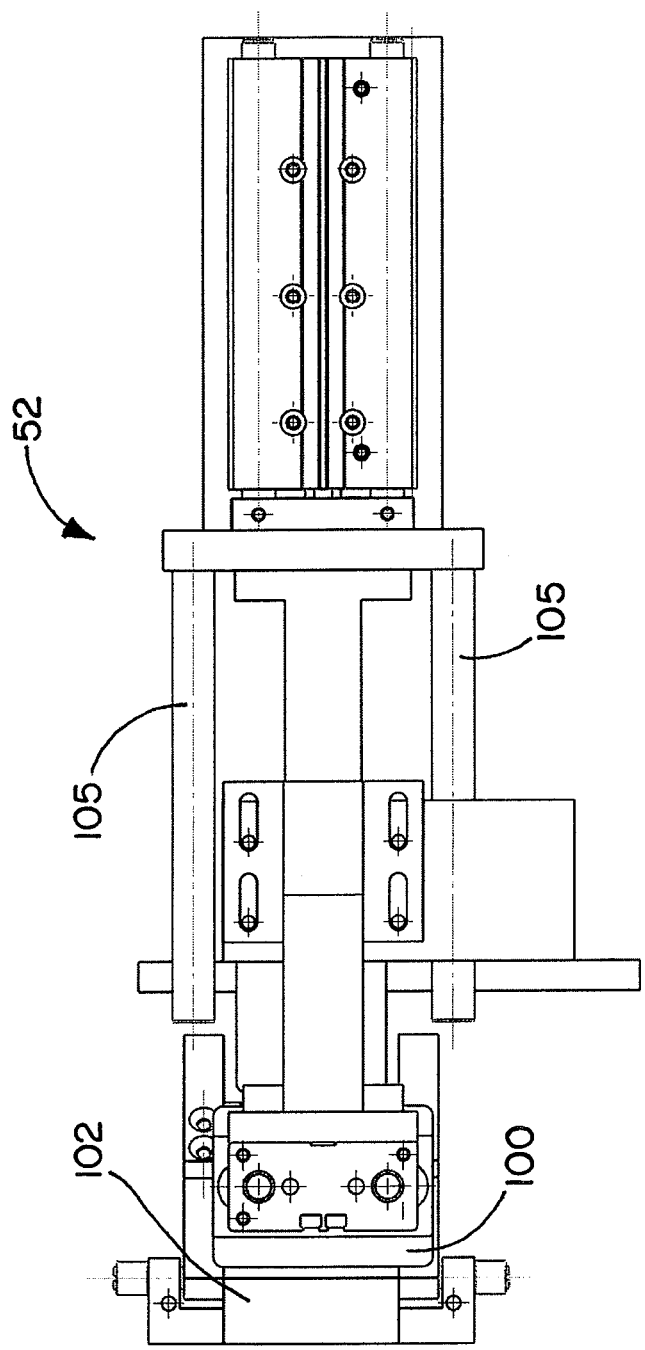
FIG. 18 is a top view of the support tab finisher assembly of FIG. 14.

As shown, the support tabs 82 include oppositely disposed first and second portions 84 and 86 (FIG. 13), connected by a transition portion 88 (FIG. 13). The transition portion 88 may be flexible to allow the first portion 84 to be applied to the first side of the sheet material 22 and the second portion 86 to be applied to the second side of the sheet material 22. While the first and second portions 84 and 86 are shown as being equally sized with identical shapes, the two portions may be of any suitable shape and size in other embodiments. A bottom side of the support tabs 82 facing the sheet material may include an adhesive for assisting in engagement of the support tabs 82 with the sheet material 22.

The illustrated support tabs 82 also include holes, which after the machine 20 punches corresponding holes through the sheet material 22, may receive respective suspension members for suspending and/or stabilizing the modified sheet material. In other embodiments, the support tabs 82 may not initially include holes and/or the suspension members may be hung from the transition portion.

In other embodiments where the machine 20 is configured only to apply support tabs 82 to one side of the sheet material 22, the support tabs 82 may include only one of the portions 84 and 86, for example. In such case, the support tabs may be configured without a transition portion, and may be of any suitable shape.

The first support tabs 82 may be applied at the leading corners of the sheet material 22, adjacent the leading corners, or at any suitable distance from the leading corners. Additional support tabs 82 are typically subsequently applied at uniform distances along the longitudinal edges of the sheet material 22. Though, the machine 20 is configured to apply spaced apart support tabs 82 via any uniform or non-uniform spacing. A pair of support tabs 82 may also be applied at the trailing corners, adjacent the trailer corners, or at any suitable distance from the trailing corners of the sheet material 22.

The number and spacing of the support tabs 82 may be calculated automatically using appropriate software stored in a computer readable medium accessed by a processor or other suitable hardware of the machine 20, such as of the controller 72. Any suitable number of support tabs 82 may be used, and for example, the number and spacing of support tabs 82 may be based on the length of the sheet material 22, which may be entered into the operator interface 73 of the machine 20 prior to commencing fabrication.

The length of the sheet material 22 is communicated to the controller 72 for appropriately controlling the automated assemblies. For example, the software is read by a processor, and preferably a processor of the controller 72, contains a number of preset sheet material size templates. The software also controls the timing of the numerous application steps of the machine 20, such as based upon pneumatic pressures and airflow speeds to desired tolerance levels, to accurately control timing and performance of the automated assemblies.

Turning again to the support tab applicator assembly 50, included is a supply portion 90 having a supply of support tabs 82 for application to the sheet material 22. The supply portion may include a feeding mechanism for receiving discrete length strips of support tabs, single support tabs, support tabs supplied on a roll, etc.

The illustrated supply portion 90 is depicted as a roll mechanism, such as a support arm, supporting a roll of individually die cut support tabs 82 adhesively attached to a backing material and wound about a center axis, and preferably wound about a center core. The roll is fed through a support tab dispenser, such as a tab dispensing cartridge portion 92, for separating the tabs 82 from the backing material. The tab dispensing cartridge portion 92 is selectively retractable for advancing the support tabs 82 towards the first side of the sheet material 22.

To engage the first side of the sheet material 22, the dispensing cartridge portion 92 is moved, such as by a cartridge actuator 94, over the longitudinal edge of the sheet material 22. As the cartridge portion 92 approaches the longitudinal edge, a first portion 84 of a support tab 82 is pushed outwardly from the cartridge portion 92 while the backing material is simultaneously removed, leaving the adhesive surface of the support tab 82 exposed and ready to make contact with the first side of the sheet material 22. The backing material and the first portion 84 of the support tab 82 may be pushed from the cartridge portion 92 by the cartridge actuator 94 moving the cartridge portion 92, or by another actuator working in conjunction with the cartridge actuator 94.

It will be appreciated that any actuator of the machine 20 may be of any suitable type, such as a linear, pneumatic, hydraulic, electric, mechanical, electro-mechanical, screw-type, or rod and cylinder type actuator.

A support tab application actuator 96, such as an air-driven cylinder, is coupled to the cartridge portion 92, such as by a support arm 98. The tab actuator 96 moves the first portion 84 of the tab 82 extending from the cartridge portion 92. Upon actuation, the application actuator 96 extends, engaging the first portion 84 of the support tab 82, and pressing the adhesive side of the first portion 84 onto the first side of the sheet material 22, at a pre-determined location, which may be designated by the controller 72. Retraction of the cartridge portion 92, such as via the cartridge actuator 94, causes the second portion 86 of the tab 82 to peel from the backing material and to hang suspended from the sheet material 22, as shown in FIG. 13. The backing material no longer wound about the supply portion 90 is gathered to prevent binding with other machine components. For example, another roller may be included to receive and wind the backing material.

Turning next to FIGS. 14 to 20, the support tab finisher assembly 52 is shown separate from the frame 40 in FIGS. 14-18. After application of the first support tab 82 via the support tab applicator assembly 50, the sheet material 22 is advanced via the advancing assembly 70 such that partially applied support tab 82 is located adjacent the support tab finisher assembly 52. The support tab finisher assembly 52 is coupled to the table 44 and engages both of the first and second sides of the sheet material 22 along its longitudinal lengths to apply a second portion 86 of support tabs thereto.

It should be noted that where the support tabs 82 are applied equally spaced apart at distances equal to the table spacing between the support tab applicator assembly 50 and the support tab finisher assembly 52, the shifting of the sheet material 22 may align a second support tab application location of the sheet material 22 with the support tab applicator assembly 50. On the other hand, where the support tabs 82 are applied at unequal spacing, or at spacing different from the spacing of the automated assemblies, the controller 72 may be configured to first move the sheet material 22 for alignment of a partially applied tab 82 with the tab finisher assembly 52, and then to align the sheet material 22 again with the tab applicator assembly 50.

Once a partially applied support tab 82 is aligned with the finisher assembly 52, the finisher assembly 52 is activated to fold the second portion 86 of the tab 82 under the sheet material 22 and to apply the second portion 86 to the second side (bottom side) of the sheet material 22. The finisher assembly 52 includes a press plate 100 to stabilize the sheet material, an underside support portion 102 to stabilize the sheet material, a fold block 104 to pre-fold the second portion 86 of the support tab 82, a push rod 105 to disengage the underside support portion 102 from the sheet material 22, and a fold roller 106 to finish applying the second portion 86 to the second, underside of the sheet material 22.

As the sheet material 22 lies atop the table 44 during its modification, the table 44 includes a support tab gap portion 110 (FIGS. 2, 5 and 6) disposed on each table edge 112 (FIGS. 1, 2, 5 and 6) for enabling application of the support tabs 82 to the second side of the sheet material. The support tab gap portion 110 extends through the table 44, allowing for engagement of the second portions 86 of the support tabs 82 with the second side of the sheet material to enable the portions of the support tabs 82 to be applied to oppositely disposed areas of the sheet material 22. The support tab gap portion 110 also enables engagement of the underside support portion 102 with the press plate 100 and with the sheet material 22, to be discussed below.

The machine 20 includes a dual actuator assembly to move the fold block 104/press plate 100 and push rod 105/fold roller 106 in succession. The dual actuators may be any suitable actuators, such as linear actuators, or alternatively may be moved via biasing members, such as springs. In other embodiments additional actuators may be included.

Figure 19:
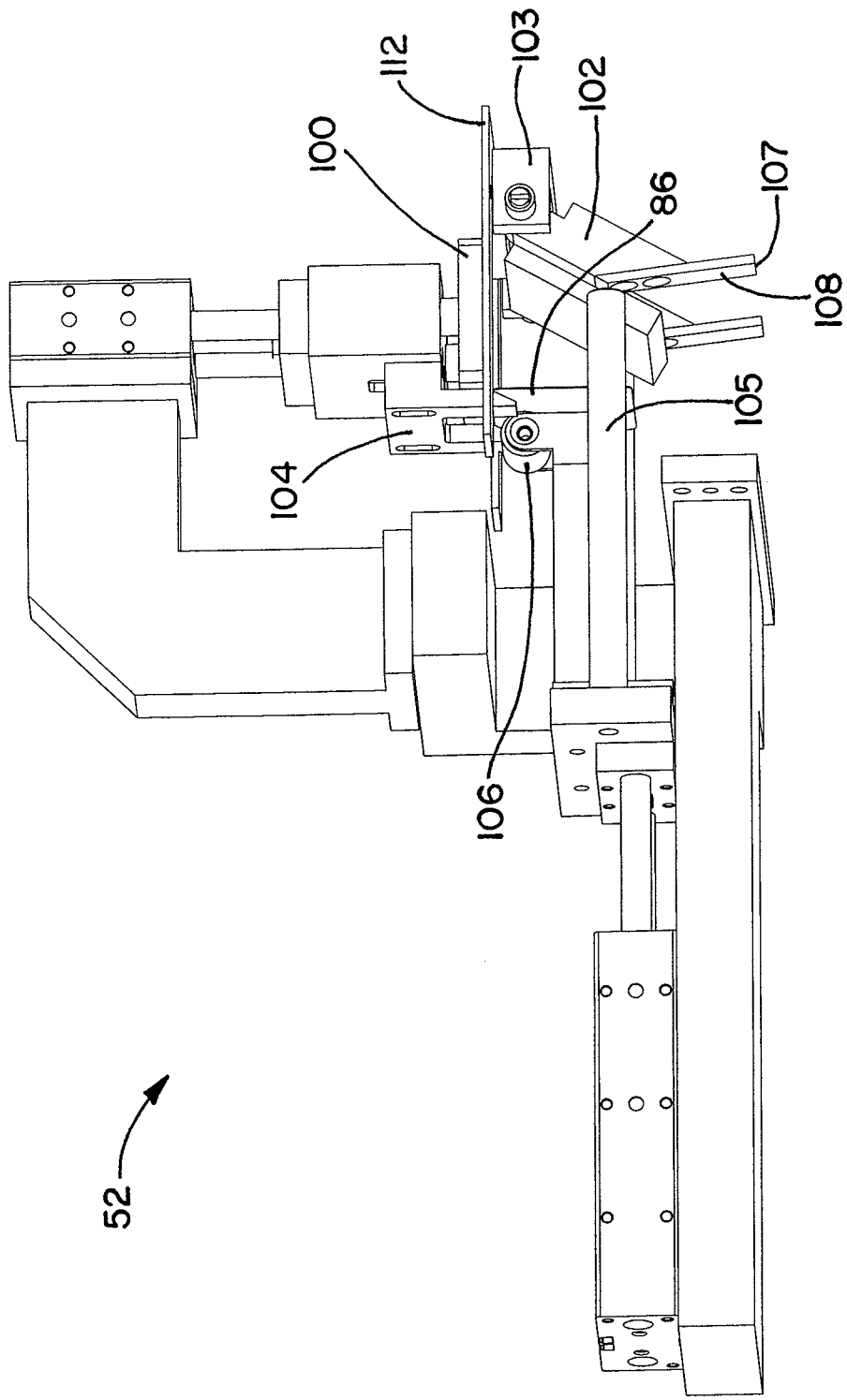
FIG. 19 is a partial front oblique view of the support tab finisher assembly of FIG. 14.

As shown in FIG. 19, a first actuator of the dual actuator assembly moves the fold block 104 to engage the second portion 86 of the support tab 82 suspended from the partially modified sheet material. The first actuator also moves the press plate 100 towards the table 44.

More particularly, the press plate 100 extends toward the table 44, the support portion 102, and the sheet material 22, to tightly engage the sheet material 22 between the press plate 100 and the table 44/support portion 102. The press plate 100 may be moved by any suitable actuator. The sheet material 22 is engaged in this manner to provide stability of the sheet material 22 and to provide a solid backing material, for application of the second portion 86 to the second side of the sheet material 22.

Both the underside support portion 102 and the press plate 100 are positioned to engage a portion of the sheet material 22 overlaying the gap portion 110, to enable engagement of the sheet material 22 without interference by the table 44. This arrangement provides for a more uniform application of the support tabs 82 to the sheet material 22.

The underside support portion 102 is biased, such as via springs, to a position adjacent the underside of the table 44. The support portion 102 provides further stability to the portion of the sheet material 22 where the support tabs 82 are applied. The underside support portion 102 may be coupled to the table 44 and may extend from under the table 44. Thus the support portion 102 may not be attached to a main body of the support tab finisher assembly 52.

The support portion 102 is configured to be moved away from its position adjacent the underside of the table 44 to allow the second portion 86 to engage the second side of the sheet material 22 and to allow the fold roller 106 to engage the second portion 86. The support portion 102 includes an angled portion 107 at one end, which has a contact surface 108 set at an acute angle relative to a central longitudinal axis of the push rod 105. The support portion 102 is pivotably secured at an end opposite the angled portion 107.

As shown, the fold block 104 moves in conjunction with the press plate 100 to pre-fold the second portion 86 of the support tab 82, though the fold block 104 and the press plate 100 may be moved separately in other embodiments. The illustrated fold block 104 moves in a downward direction and includes an inclined surface 120 for moving the second portion 86 out of planar alignment with at least one of the sheet material and the first portion 84, thus bending the flexible transition portion 88.

Thus, as depicted in FIG. 19, the fold block 104 pushes the second portion 86 of the support tab 82 into a nonplanar position relative to the first portion 84. The inclined surface 120 may be at an angle relative to a sheet plane of the sheet material 22. The angle may be between 30 and 90 degrees, preferably between 45 and 60 degrees, and more preferably at 60 degrees.

Figure 20:
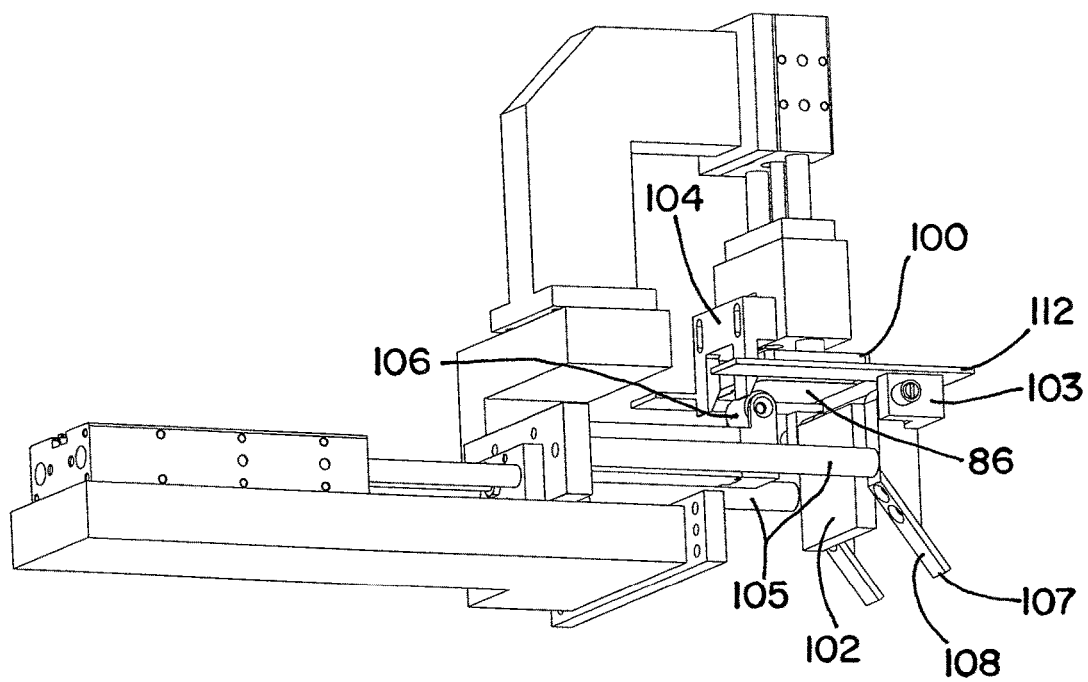
FIG. 20 is another partial front oblique view of the support tab finisher assembly of FIG. 14.

As shown in FIGS. 19 and 20, a second actuator of the dual actuator assembly moves the fold roller 106 to engage the second portion 86 in the nonplanar position, and the push rod 105 moves the support portion 102 causing it to be spaced form the second portion 86. As the second actuator advances the fold roller 106 (a) first towards the second portion 86 that is displaced by the fold block 104 and (b) second towards the sheet material 22, the push rod 105 engages the retractable support portion 102 to move it out of engagement with a portion of the second side of the sheet material 22 to which the second portion 86 is to be attached.

As the push rod 105 moves toward the support portion 102, it engages the contact surface 108 of the angled portion 107. Continued forward movement of the rod 105 causes the support portion 102 to be pivoted about an axis substantially parallel to the table 44. The support portion 102 is rotated from its default position, disposed substantially parallel with the table 44 and adjacent the second portion 86, to a second position, disposed substantially orthogonal to the default position. In the second position, the support portion 102 is spaced from table 44, from the second portion 86, and from the fold roller 106.

The fold roller 106 engages the second portion 86 at substantially the same time as the rod 105 engages the support portion 102. The fold roller 106 includes a cylindrical roller pivotably coupled to a pivot pin. In other embodiments, the fold roller 106 may be of any other suitable shape. Alternatively, the fold roller 106 may not pivot and may be a substantially cylindrical member. The fold roller 106 and the fold block 104 may be made of any suitable material for moving the support tabs 82, such as Teflon or other low friction materials.

Figure 21:
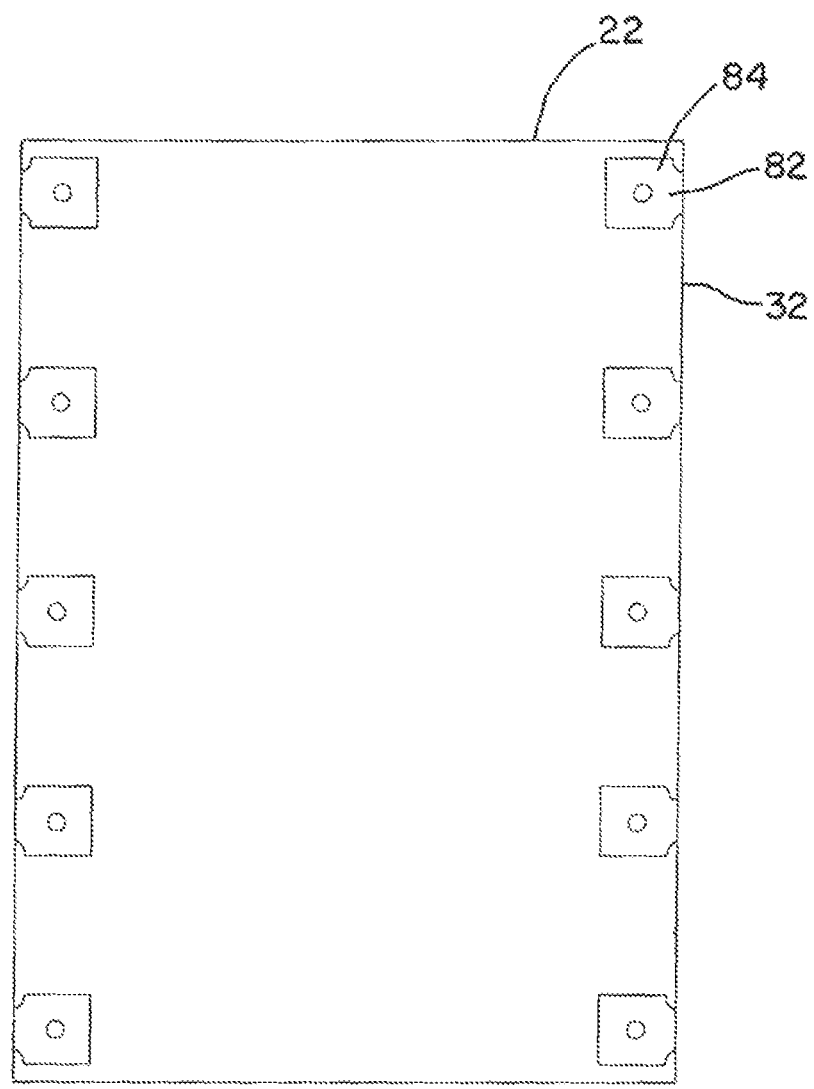
FIG. 21 is a top view of a sheet material showing first and second portions of support tabs applied to the sheet material by a support tab applicator assembly and a support tab finisher assembly of the exemplary banner making machine of FIG. 1.
Figure 22:
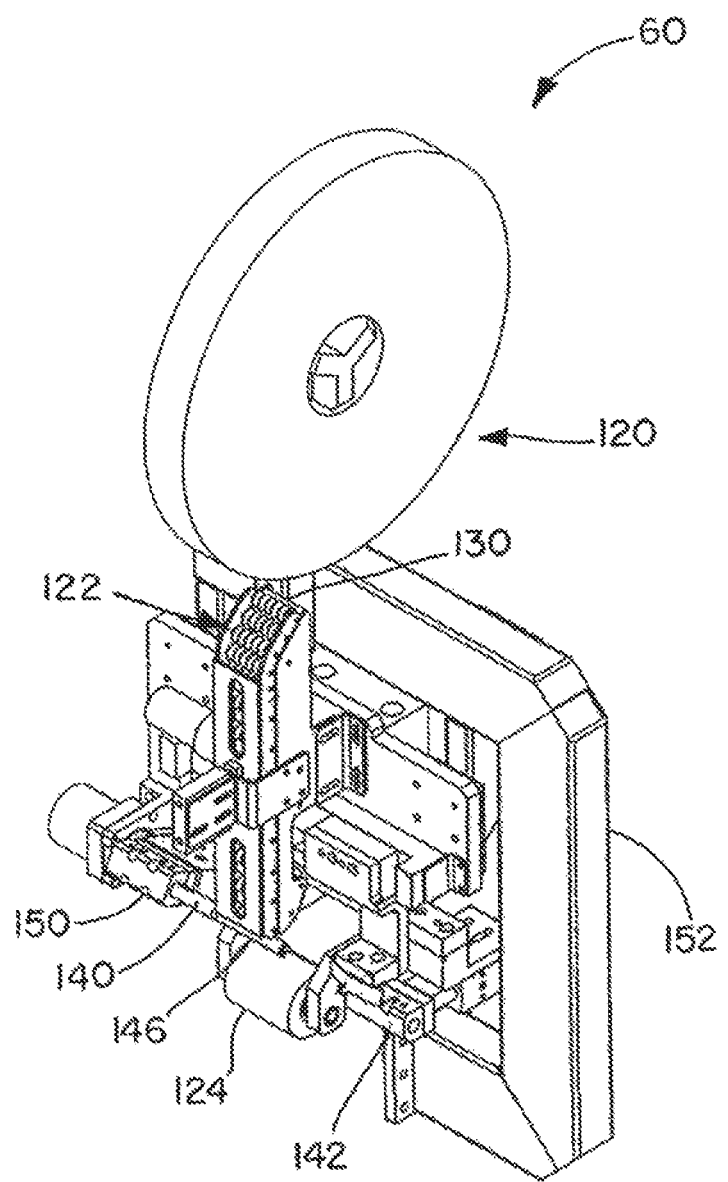
FIG. 22 is a side oblique view of a strengthening film applicator assembly of the exemplary banner making machine of FIG. 1.
Figure 23:
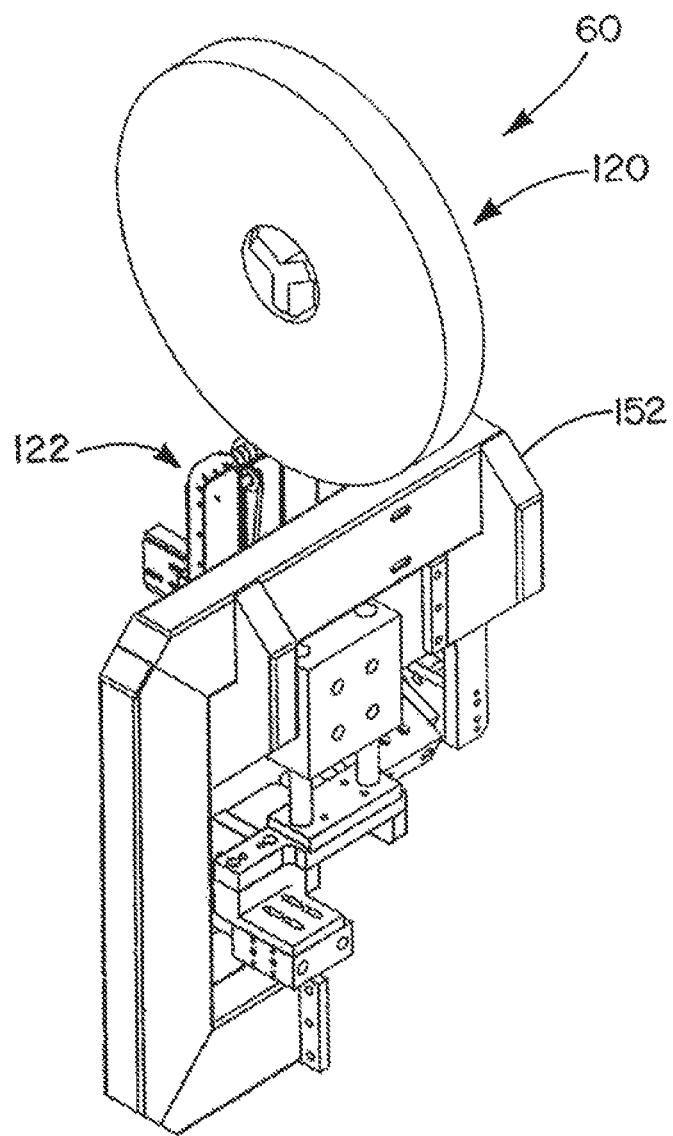
FIG. 23 is another side view of the strengthening film applicator assembly of FIG. 22.
Figure 24:
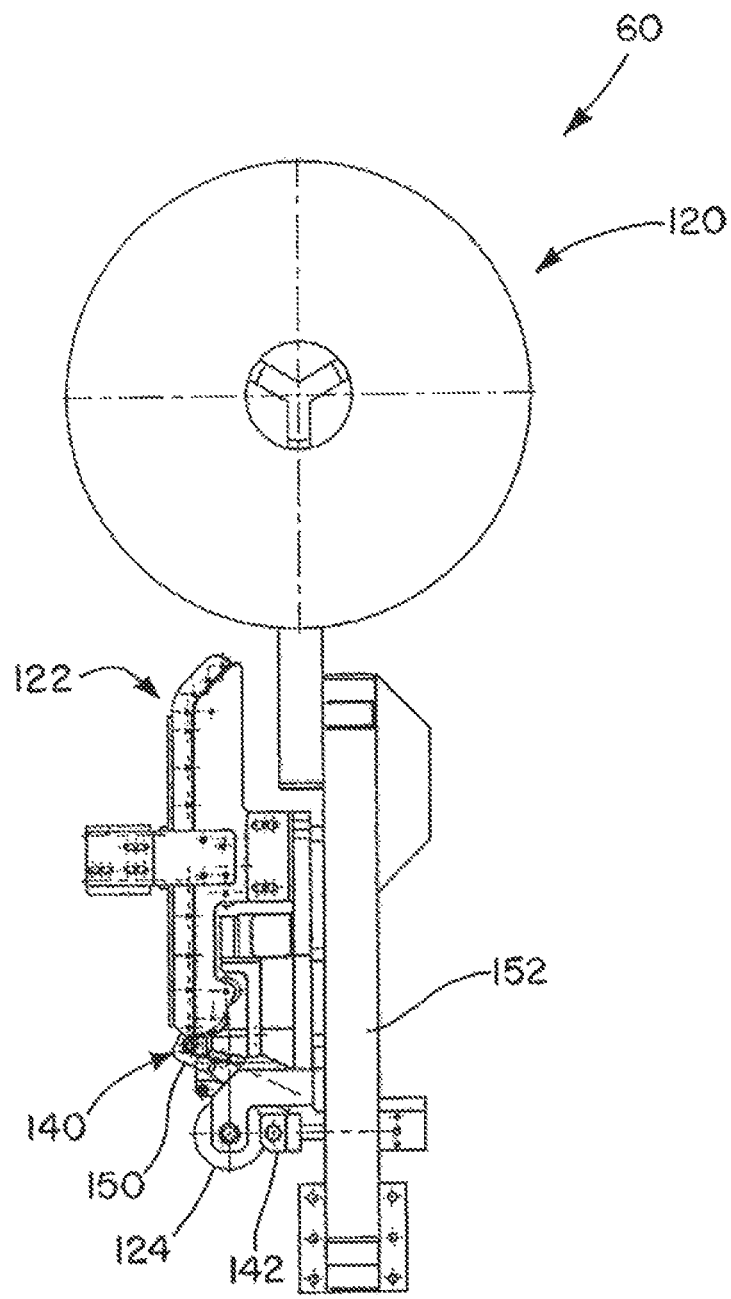
FIG. 24 is a front view of the strengthening film applicator assembly of FIG. 22.
Figure 25:
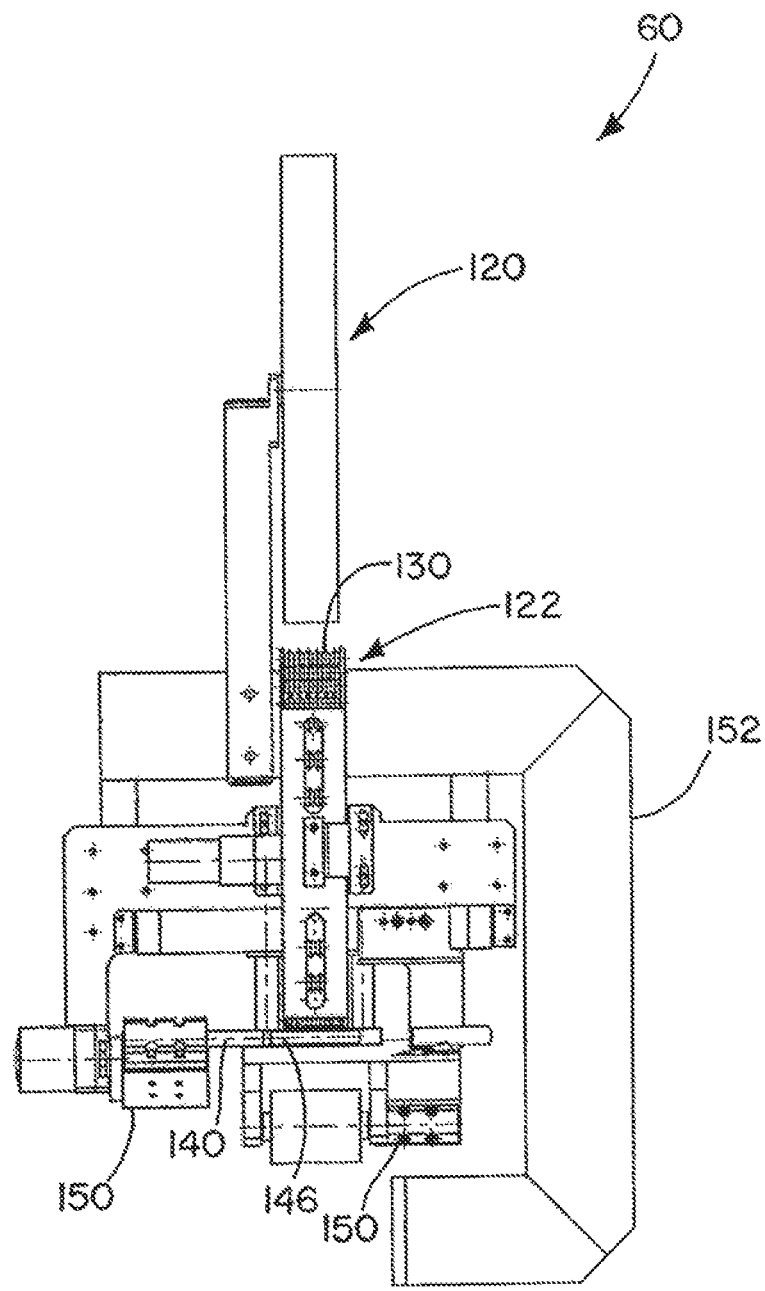
FIG. 25 is a side view of the strengthening film applicator assembly of FIG. 22.
Figure 26:
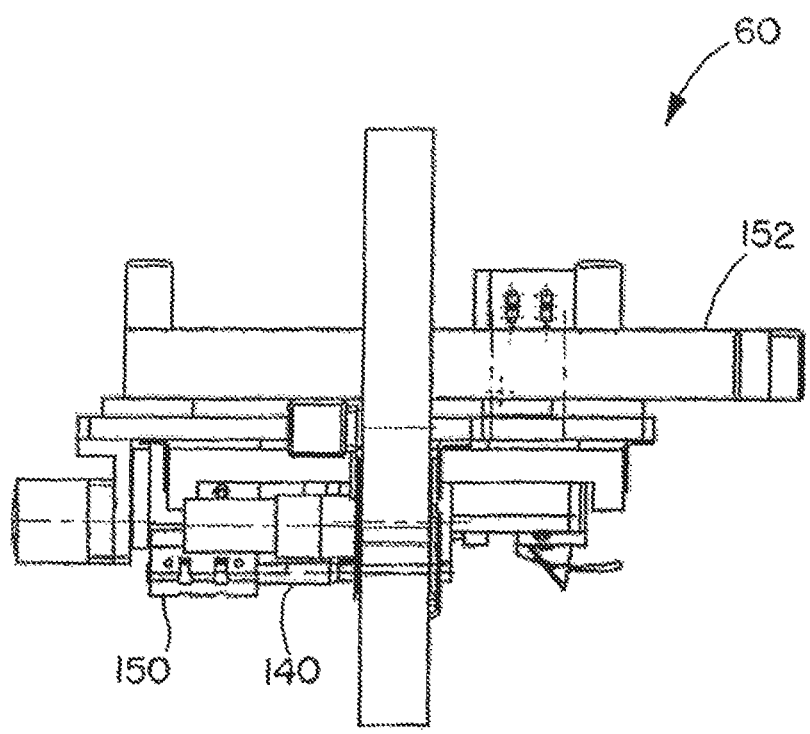
FIG. 26 is a top view of the strengthening film applicator assembly of FIG. 22.

The fold roller 106 moves the second portion 86 from the nonplanar position to a position applied to the second side of the sheet material 22, where the first portion 84 is arranged substantially parallel to the second portion 86, as shown in FIG. 21, showing the sheet material 22 with applied support tabs 82 and separate from the machine 20. The illustrated fold roller 106 is moved in a direction substantially parallel to the sheet plane of the sheet material 22 to further bend the transition portion 88 to fold the second portion 86 under the sheet material 22.

The result of this movement is the final application of the adhesive side of the second portion 86 to the second side of the sheet material 22. Further, as the fold roller 106 and push rod 105 retract, the support portion 102 is rotatably returned to its default position adjacent the underside of the table 44 in preparation for application of another second portion 86.

It is noted that in other embodiments, the support portion 102 may be configured to slideably retract from the table edge 112 and from the second portion 86, such as via contact with the rod 105. Alternatively, the support portion 102 may be configured to rotatably move about an axis orthogonal to the table 44 and away from the second portion 86.

Referring now to FIGS. 22 to 29, the strengthening film applicator assembly 60 is shown separate from the remainder of the machine 20, and also separate from the frame 40. The illustrated strengthening film applicator assembly 60 is coupled to the table 44 for applying strengthening film to the first (upper) side of the sheet material 22, though in other embodiments, strengthening film may be applied additionally or alternatively to the second (bottom) side of the sheet material 22.

After application of the first support tabs 82 by the support tab applicator assembly 50 and the support tab finisher assembly 52, the sheet material 22 is advanced by the advancing assembly 70 to a location of subsequent support tab application. Though in other embodiments, application of support tabs 82 may be omitted.

Simultaneously with the advancing, the illustrated machine 20 applies strengthening film via the strengthening film applicator assembly 60. The strengthening film is applied over the already applied first set of support tabs 82 and over the sheet material 22, along opposite longitudinal lengths of the sheet material 22, which are substantially parallel with the respective longitudinal edges of the sheet material 22. It will be appreciated that the machine 20 may be configured to apply discrete lengths of strengthening film or continuous strengthening film to the sheet material 22.

To apply the strengthening film, the strengthening film applicator assembly 60 includes a film supply portion 120, a guide portion 122, and an application roller 124. The film supply portion 120 is depicted as a support arm supporting a roll of film wound about a center core. The roll is fed through the guide portion 122 to contact the application roller 124.

As shown, the guide portion 122 includes a plurality of guide bushings 130, such as bearing rollers, for supporting the film between the supply portion 120 and the application roller 124. The film is guided through the guide portion 122 with the adhesive side of the film disposed opposite the guide bushings 130.

After application of the film to the application roller 124, to be further described, the application roller 124 is moved to engage with the table 44 and thus with the sheet material 22 via an actuator, which may be any suitable actuator. Upon completion of application of strengthening film to the sheet material 22, the film is cut, and the process is repeated for application to a subsequent sheet material 22.

To cut the film, the film applicator assembly 60 includes a severing mechanism 186 that has a blade 190 carried by a blade carriage 192. Also included is a blade biasing member 191, such as a leaf spring, for biasing the strengthening film against other components of the assembly 60, to be described further.

To position the film onto the application roller 124 and then further position the film after cutting for another application to the same sheet material 22 or to a different sheet material 22, the film applicator assembly 60 includes an entry finger bar 140 and an exit finger bar 142. Each of the finger bars 140 and 142 are substantially cylindrical in shape and have extending therefrom one or more engagement bosses 146.

The engagement bosses 146 extend from less than a full circumferential extent of the finger bars 140 and 142 for engaging the adhesive side of the film, while preventing adhesion of the film to the finger bars 140 and 142. As depicted, the engagement bosses 146 are made of Teflon or any other suitable material having a low coefficient of friction. Each finger bar 140 and 142 includes two oppositely disposed, radially-outwardly extending engagement bosses 146. The engagement bosses 146 extend from an external surface of the finger bars 140 and 142. The bosses 146 extend a distance that is preferably less than a radius of the respective finger boss 140 or 142. In other embodiments, the bosses 146 may extend any suitable distance and any suitable number of bosses 146 may be included.

The entry finger bar 140 and exit finger bar 142 are pivotably coupled to finger supports 150, such as support carriages, which are coupled to a main body 152 of the applicator assembly 60. The carriages 150 are also translatable in a linear direction, and thus the finger bars 140 and 142 may be pivoted about the application roller 124 and also moved towards and away from the application roller 124.

The film applicator assembly 60 includes suitable actuators for pivoting and linearly translating the support carriages 150, and thus for pivoting and linearly translating the bars 140 and 142, between positions spaced from the application roller 124 and positions adjacent the application roller 124, and between positions rear (downstream) and forward (upstream) of the application roller 124.

Thus as the film moves through the film applicator assembly 60, and over the finger bars 140 and 142, the bars 140 and 142 pivot and translate to engage and disengage the adhesive surface of the film from permanently the bars 140 and 142. As the bars 140 and 142 pivot, the film preferably engages only surfaces of the engagement bosses 146 and does not contact other external surfaces of the finger bars 140 and 142. In this way, the entry and exit finger bars 140 and 142 act as guides for the film as it transitions between the guide portion 122 and the application roller 124.

During application of the film to the sheet material 22, the entry and exit finger bars 140 and 142 and the severing mechanism 186 are moved separately from one another via precise timing, which is controlled via a suitable controller, such as the controller 72. This process maintains continuous mechanical control over the film, and ensures that the film is not free floating, thereby preventing binding of the film applicator assembly 60 and/or defects in the application of the film to the sheet material 22. Such defects may include wrinkles, bubbles, stretching, or other functional and/or cosmetic defects.

Figure 28A:
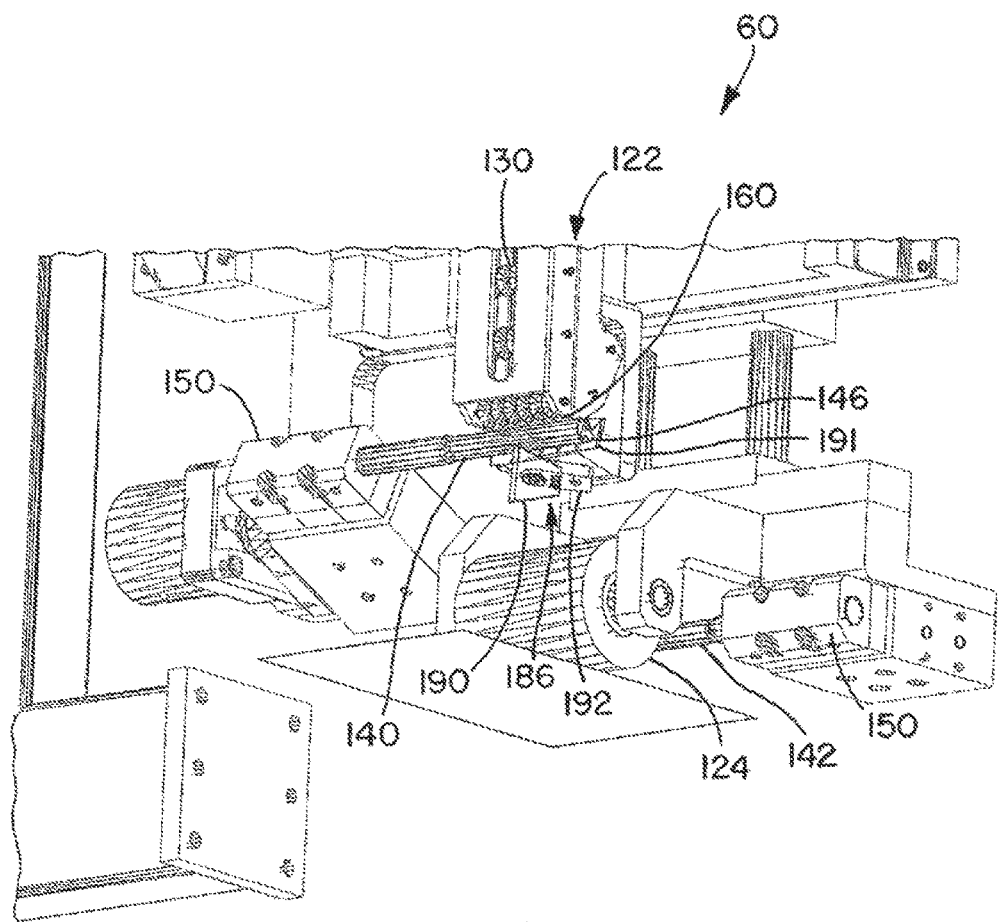
FIG. 28a is a partial oblique view of the strengthening film applicator assembly of FIG. 22 showing the assembly prior to loading of strengthening film to the application roller.

Turning first to FIG. 28a, prior to any application of a film 160 to the sheet material 22, a length of the film 160 extends from the supply portion 120. The length of the film 160 extends through the guide portion 122, with an adhesive side facing away from the guide bushings 130. A non-adhesive side of the film disposed opposite the adhesive side faces and contacts the guide bushings 130. A distal end of the length of the film 160 extends through the guide portion 122 and the non-adhesive side of the distal end engages the blade biasing member 191. In this position, the severing mechanism 186 is in an inward position.

At this point, the severing mechanism 186 is caused to move to an outward position spaced form the inward position. This movement, and preferably laterally sliding movement, causes the adhesive side of the tape to be pressed against the engagement bosses 146 of the entry finger bar 140. Thus, the distal end of the film 160 is continuously controlled and is not enabled to float freely without contact by one of the severing mechanism or the entry finger bar 140.

Figure 28B:
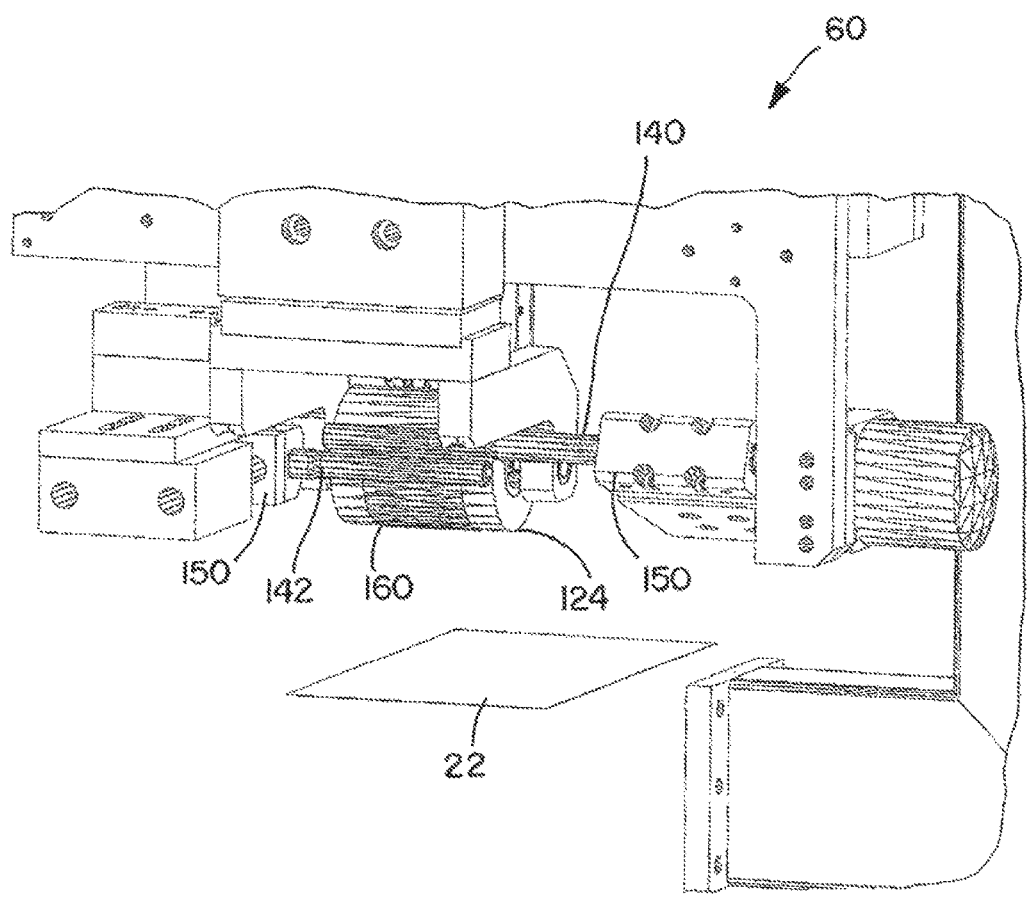
FIG. 28b is a partial oblique view of the strengthening film applicator assembly of FIG. 22 showing the assembly after loading of strengthening film to the application roller.

Turning next to FIG. 28b, the strengthening film assembly is shown from a rear view, with the film 160 applied to the application roller 124. To move the film to the application roller 124, a bar actuator moves the entry finger bar 140, which includes at least one of pivoting or translating the respective support carriage 150 relative to the application roller 124, to ultimately move the entry finger bar 140 to the rear (downstream) of the application roller 124. Movement of the finger bar 140 pulls the film through the guide portion 122 from the supply portion 120. The film maintains contact with the respective engagement bosses 146 as the entry finger bar 140 moves. At this point, the entry finger bar 140 is caused to further pivot while the application roller 134 is caused to rotate, and thus the film 160 is wrapped about the application roller 124, with the non-adhesive side of the film 160 facing the application roller 124.

After the film 160 is rotated about the application roller 124, the exit finger bar 142 is translated radially inwardly towards the application roller 124. The exit finger bar 142 engages the application roller 124 and the adhesive side of the film 160 below a position of the entry finger bar 140.

Figure 28C:
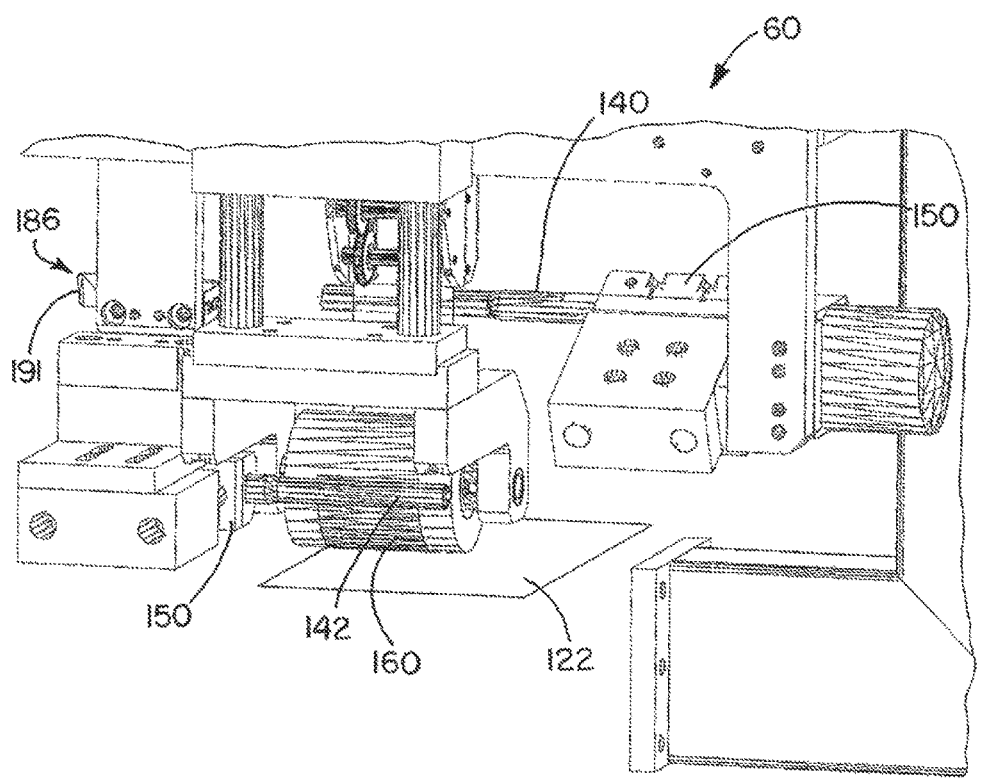
FIG. 28c is another partial oblique view of the strengthening film applicator assembly of FIG. 22 showing the assembly after loading of strengthening film to the application roller.

Turning then to FIG. 28c, the entry finger bar 140 is shown moved forward (upstream) of the application roller 124 from its previous position rear (downstream) of the application roller 124 (FIG. 28b). Thus, the entry finger bar 140 is linearly translated radially outwardly away from the application roller 124 to release the respective engagement bosses 146 from the adhesive side of the film 160. The entry finger bar 140 is then rotated about the application roller 124 to its position shown in FIG. 28c, forward (upstream) of the application roller 124.

Figure 28D:
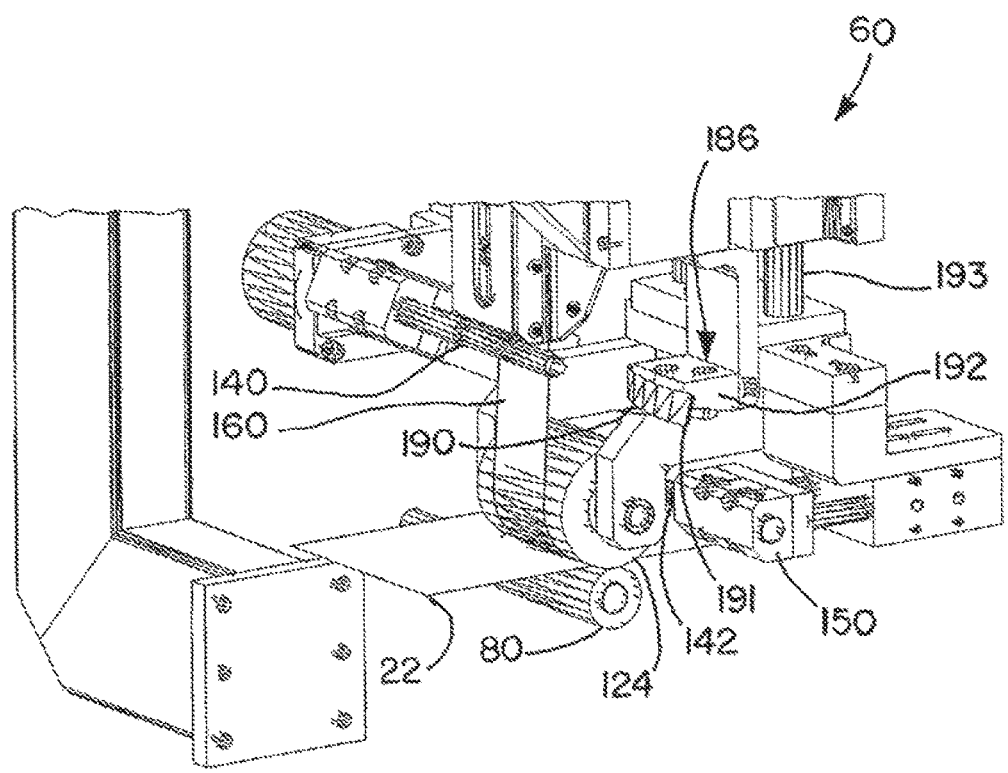
FIG. 28d is a partial oblique view of the strengthening film applicator assembly of FIG. 22 showing the applying tape to a sheet material and prior to cutting of the strengthening film.

Now turning to FIG. 28d, after the film 160 is loaded onto the application roller 124 and the sheet material 22 is moved into position via the advancing assembly 70, the application roller 124 and the exit finger bar 142 are moved together towards the table 44 and the sheet material 22. The exit finger bar 142 is then caused to move away from the adhesive side of the film 160, via at least one of pivoting or translating, to disengage the film 160 from the respective engagement bosses 146.

Consequently, the leading edge of the film 160 is caused to fall onto the sheet material 22 adjacent the leading edge of the sheet material 22. As the sheet material 22 is advanced via the advancing assembly 170, the film is applied to the longitudinal edge 32 of the sheet material 22 via the application roller 124 and the drive assembly 80, to be described further.

Figure 28E:
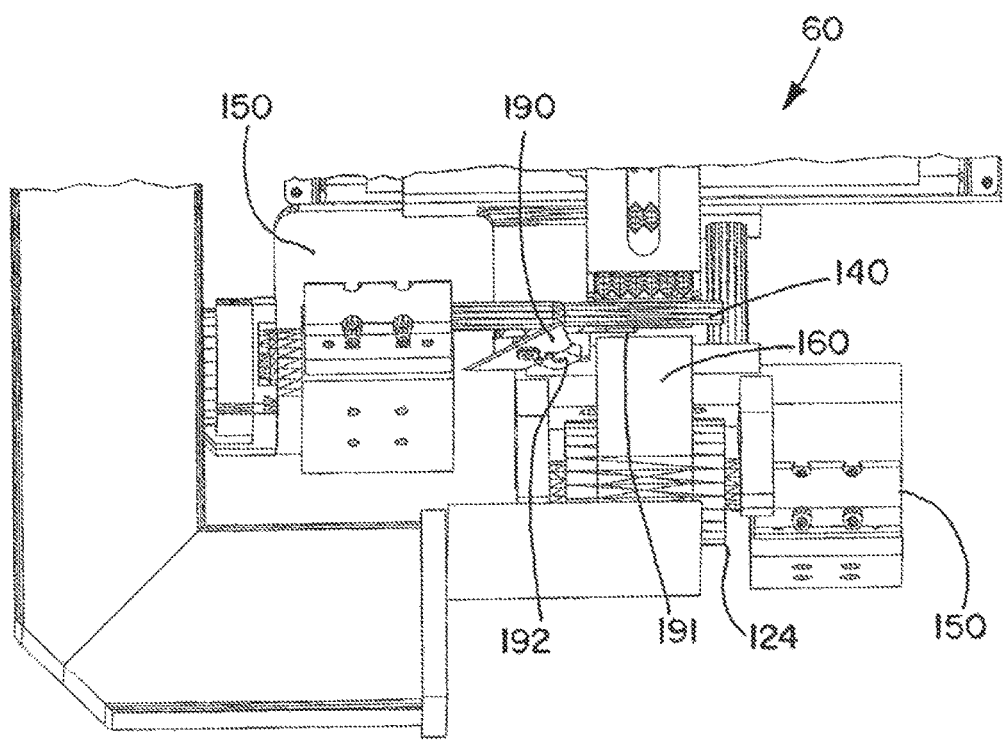
FIG. 28e is a partial oblique view of the strengthening film applicator assembly of FIG. 22 showing the assembly after cutting of the strengthening film.

Turning next to FIG. 28e, when the end of the sheet material 22 approaches the strengthening film applicator assembly 60, movement of the sheet material 22 is stopped via the controller 72. The entry finger bar 140 is caused to pivot and/or translate to engage the adhesive side of the film 160 substantially in the initial position where the entry finger bar 140 first engaged the distal leading end of the film 160 (FIG. 28a).

Next, the severing mechanism 186 is moved from the outward position back to the inward position, causing the blade 190 to cut the film 160. During this cutting, the blade 190 is disposed in a blade plane, which is aligned at a specified angle relative to the sheet material 22. The specified angle of the blade plane 194 is at approximately 5-15 degrees above the horizontal, i.e. at an acute angle of approximately 5-15 degrees relative to a sheet plane of the sheet material 22. More preferably, the blade plane is at an acute angle of approximately 11 degrees relative to the sheet plane.

The sheet material 22 also includes a bisecting plane aligned orthogonal to the sheet plane and bisecting the longitudinal length of the sheet material 22, thus extending between oppositely disposed longitudinal edges 32 of the sheet material 22. A transverse plane is aligned orthogonal to each of the sheet plane and the bisecting plane, and extends parallel to the longitudinal working length 24 of the frame 40.

Accordingly, in the illustrated embodiment, the blade plane lies orthogonal to the transverse plane and also lies at an acute angle of approximately 45-80 degrees relative to the bisecting plane. More preferably, the blade plane is at an acute angle of approximately 60 degrees relative to the bisecting plane.

The blade plane is also aligned at an angle of approximately 60 degrees relative to a film plane of the film 160 extending between the guiding portion 122 and the application roller 124. This is because the film plane is disposed substantially parallel to the bisecting plane.

Returning to FIG. 28e, after the cutting of the film 160 by the blade 190, the leading edge of the film 160 connected to the film supply portion 120 is engaged between the blade biasing member 191 and the entry finger bar 140. Thus, the leading edge of the film 160 is continuously controlled via the assembly 60. The trailing edge of the film 160 that is applied to the sheet material 22 is caused to land adjacent the trailing edge of the sheet material 22.

Finally, the severing mechanism 186 is again moved from the inward position to the outward position, again engaging the adhesive side of the distal end of the film 160 to the respective engagement bosses 146 of the entry finger bar 140, as previously explained with reference to FIG. 28a. At this point, the strengthening film applicator assembly 160 is prepared for a subsequent application to a subsequent sheet material 22.

Accordingly, upon completion of application of a length of film 160 to the sheet material 22, the entry finger bar 140 moves in conjunction with the severing mechanism 186 to position the film 160 for severing, to ensure a clean cut of the film 160, and to maintain control of the film 160. By maintaining control of the film 160, no operator intervention is needed to again engage a distal free end of the film 160 with the application roller 124.

It will be appreciated that in some embodiments, the machine 20 may not include the strengthening film applicator assembly 60 and thus no strengthening film will be applied. In other embodiments, the machine 20 may be configured to apply the strengthening film prior to application of the support tabs 82 or with support tabs 82 omitted.

Figure 27:
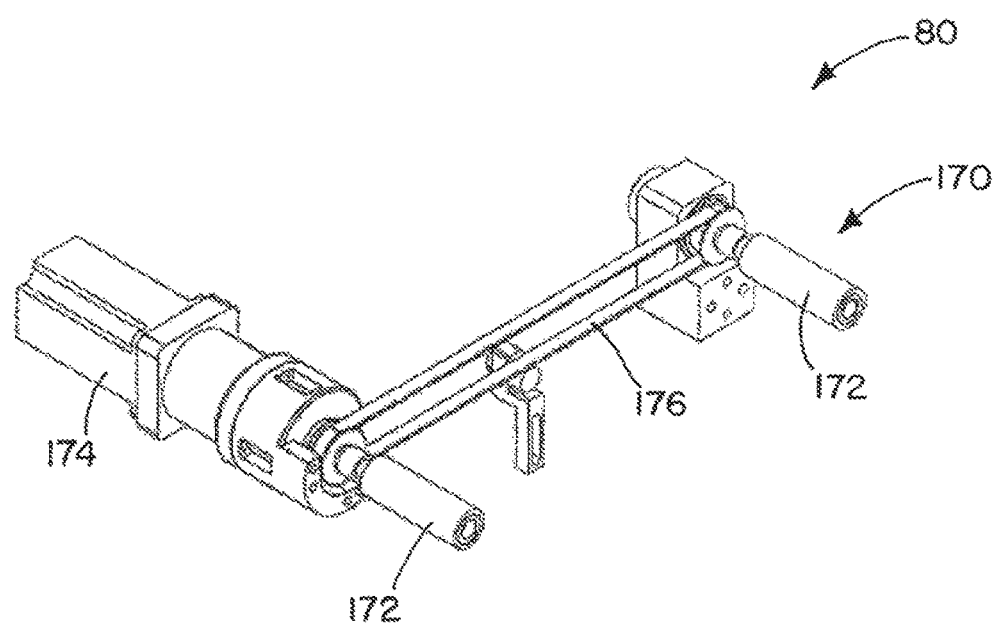
FIG. 27 is an oblique view of a drive assembly of the exemplary banner making machine of FIG. 1.

Turning now to FIG. 27, an upper portion 170 of the drive assembly 80 is depicted separate from the remainder of the banner making machine 20. An upper portion 170 of the drive assembly 80 is coupled to a top side of the table 44, such that the sheet material 22 is engaged between the upper portion 170 and the table 44. The upper portion 170 includes two pressure rollers 172, driven by a suitable power source, such as a rotary motor 174, and connected by a transition member 176. In other embodiments, any suitable number, one or more, of pressure rollers 172 may be used.

A lower portion 178 (FIG. 6) of the drive assembly 80 is also coupled to the table 44, though the lower portion 178 is coupled to an underside of the table 44. The lower portion 178 may be included or omitted in the machine 20. The illustrated lower portion 178 is similar to the upper portion 170 and also includes two pressure rollers driven by a suitable rotary motor and connected by a transition member. In other embodiments, the lower portion 178 may include any suitable number of pressure rollers and/or the pressure rollers of the lower portion 178 may be driven via the rotary motor 174 of the upper portion 170.

Figure 29:
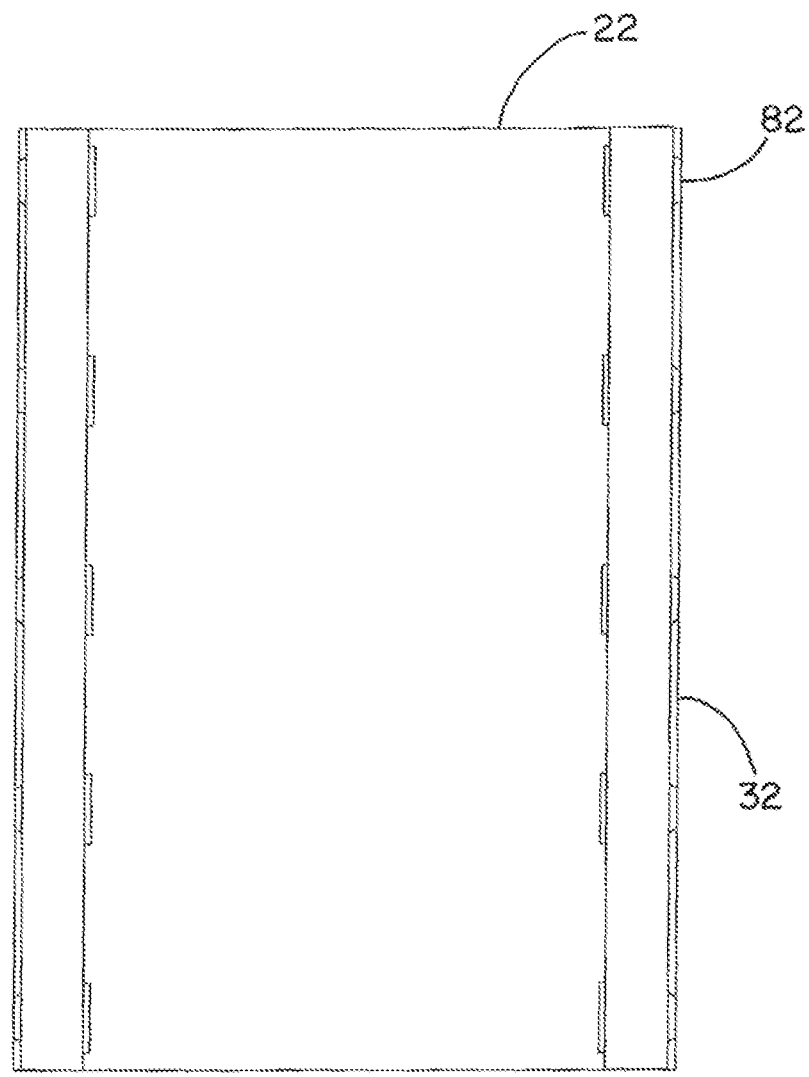
FIG. 29 is a top view of a sheet material showing first and second portions of support tabs applied to the sheet material by a support tab applicator assembly and a support tab finisher assembly, and showing strengthening film applied by a strengthening film applicator assembly of the exemplary banner making machine of FIG. 1.
Figure 30:
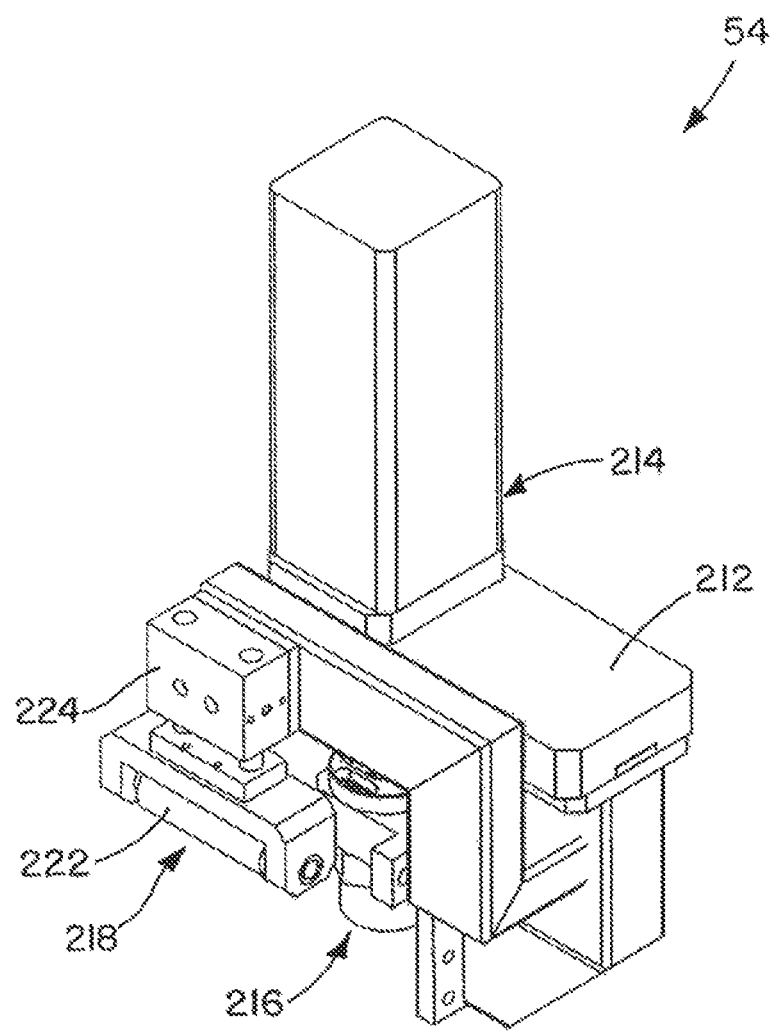
FIG. 30 is a side oblique view of a hole punch assembly of the exemplary banner making machine of FIG. 1.
Figure 31:
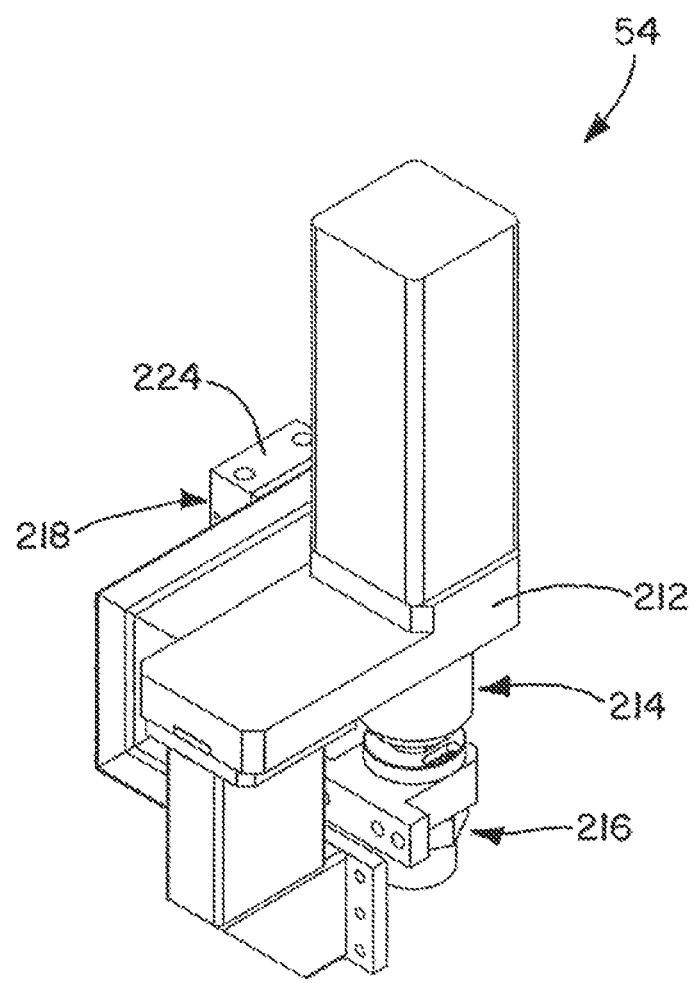
FIG. 31 is another side oblique view of the hole punch assembly of FIG. 30.
Figure 32:
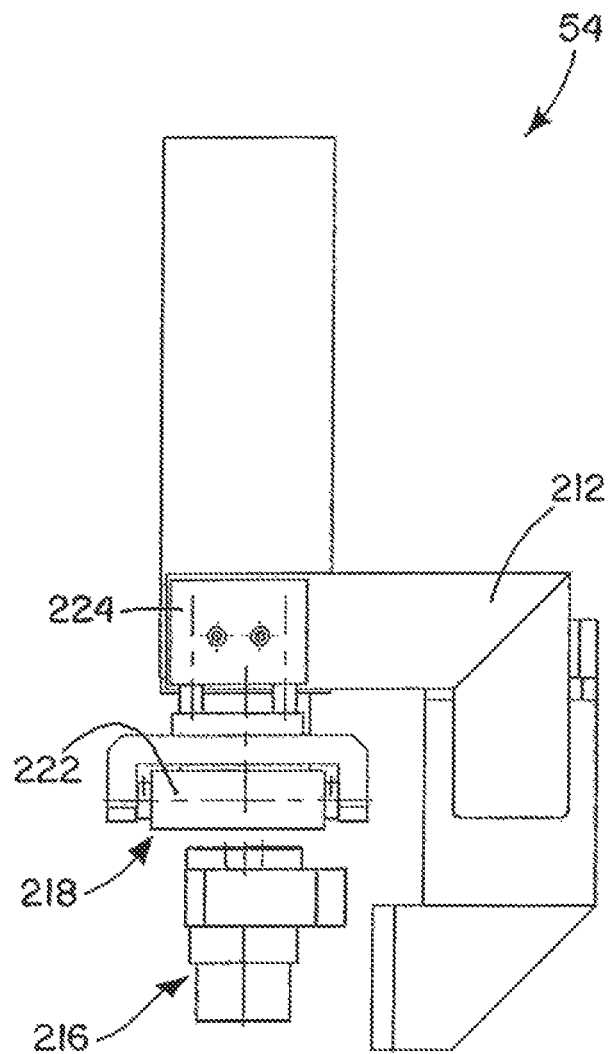
FIG. 32 is a side view of the hole punch assembly of FIG. 30.
Figure 33:
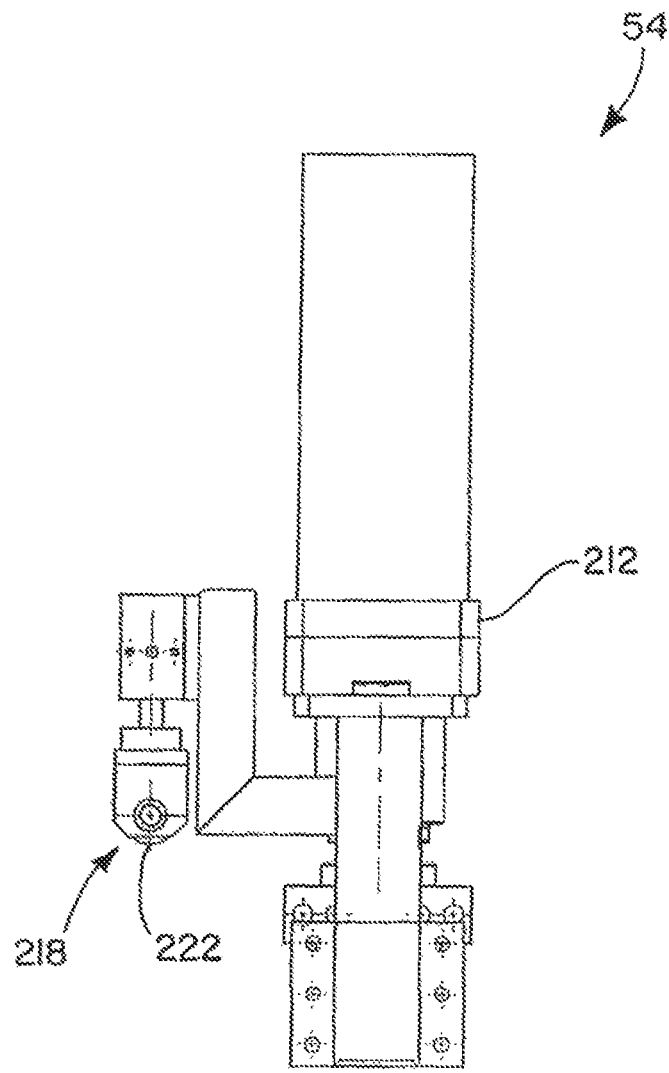
FIG. 33 is a rear view of the hole punch assembly of FIG. 30.
Figure 34:
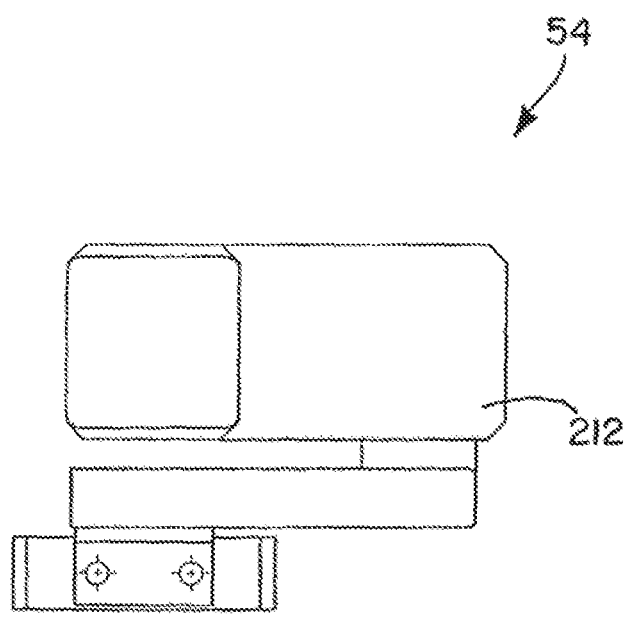
FIG. 34 is a top view of the hole punch assembly of FIG. 30.

As shown (see, e.g., FIG. 5), the table 44 may include drive cutouts 182 aligned with the pressure rollers 172 of the lower portion 178. In this way, the lower portion drive rollers 172 may contact the second side of the sheet material 22. The lower portion rollers 172 may also be disposed adjacent the upper portion rollers 172, thus clamping the sheet material 22 between the rollers 172. In this way, the drive assembly 172 and pressure rollers 172 may serve a dual function of advancing the sheet material 22 and also of further pressing the strengthening film 160 and support tabs 82 against the sheet material 22, such as to provide a uniform seal to the sheet material 22. Accordingly, the banner product exiting the film applicator assembly 60 of the illustrated machine 20 includes a film 160 applied over longitudinal edges of the sheet material 22 and also applied over the first portions 84 of the support tabs 82 applied to the first side of the sheet material 22, as shown in FIG. 29, showing a partially finished final product separate from the machine 20.

Referring next to FIGS. 30 to 35, the hole punch assembly 54 is shown separate from the remainder of the machine 20, and also separate from the frame 40. The illustrated hole punch assembly 54 is coupled to the table 44 for cutting holes through at least the sheet material 22, and in some embodiments, through one or both of the support tabs 82 and the strengthening film 160. For example, in the illustrated embodiment, the support tabs 82 are die cut with holes pre-existing through the support tabs 82, while other support tabs 82 may not include pre-existing holes.

After application of the strengthening film 160, the advancing assembly 70 may again advance the sheet material 22. Another set of support tabs 82 may be applied, while the machine 20 simultaneously continues to apply strengthening film 160, and also while the hole punch assembly 54 simultaneously punches, such as cuts, a hole through at least the sheet material 22 at the location of a set of support tabs 82. The controller 72 is configured to appropriately track and recognize longitudinal locations of support tab applications along the longitudinal lengths of the sheet material 22, thus enabling punching of holes at one of, a selection of, or all of these locations. For example, the controller 72, which is communicatively coupled to each of the automated assemblies, may use encoded data provided from the advancing assembly 70 or from the drive assembly 80 to track positions of the applied support tabs 82.

The hole punch assembly 54 includes a main body 212 having a punch portion 214, a punch removal portion 216, and a flattening portion 218. The punch portion 214 is coupled to the main body 212 and includes a mechanism for cleanly cutting through multiple material types, including the sheet material 22, support tabs 82, and/or strengthening film 160. The punch portion 214 is configured to quickly cut through these multiple components while also fully removing the material portion that is cut out.

The illustrated punch portion 214 includes a linear punch driven by a linear actuator, though any other suitable punch, such as a rotary punch, may be used. While the punch portion 214 is configured to punch circular holes, any suitable hole shape may be used, though a circle provides a minimal chance of tear propagation from the hole through the adjacent material.

The punch removal portion 216 is coupled to the underside of the table 44 and may be separate from the main body 212. The punch removal portion 216 is aligned at a punch gap 220 (FIGS. 5 and 6) extending through the table 44, and allowing for the punch removal portion 216 to receive at least partially therein a portion of the punch portion 214 when actuated. Material removed from one or more of the sheet material 22, support tabs 82, and strengthening film 160 may pass through the punch removal portion 216 and may be stored in a scrap chamber of the punch removal portion 216 (not shown) or may instead drop into a scrap bin located below the punch removal portion 216.

Figure 35:
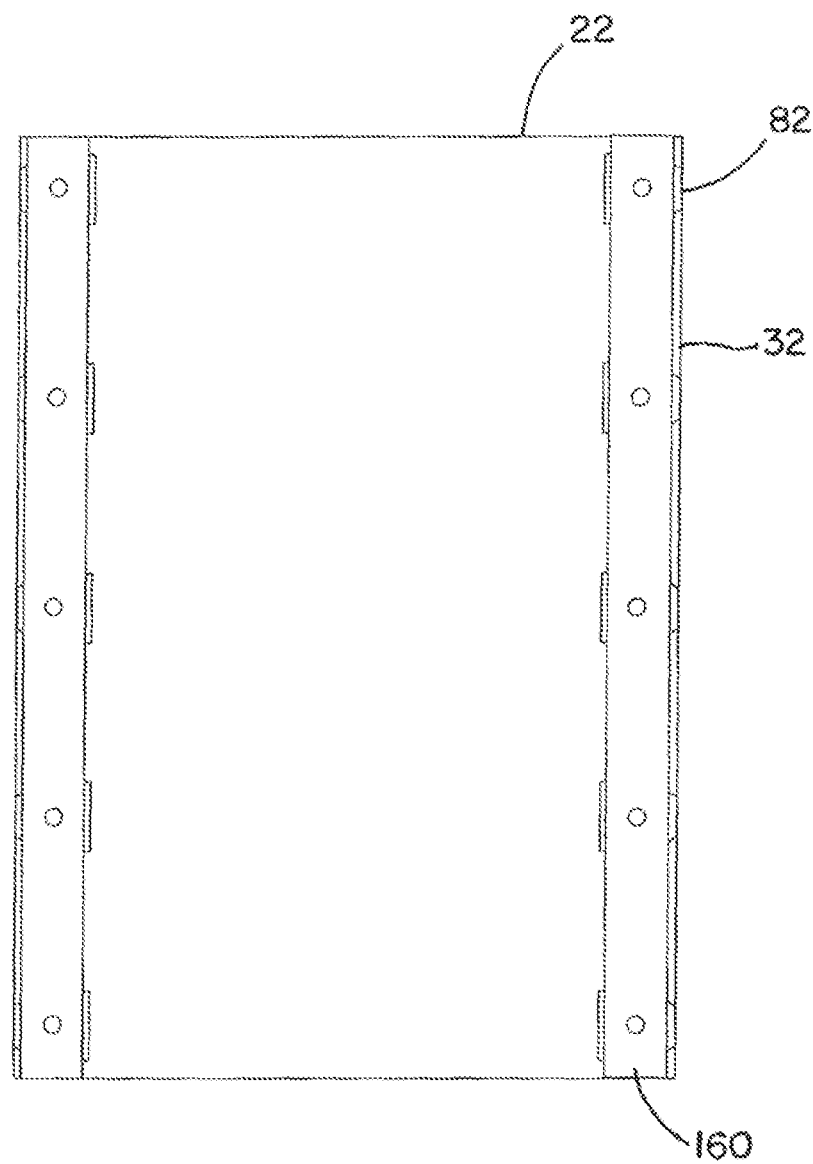
FIG. 35 is a top view of a sheet material showing first and second portions of support tabs applied to the sheet material by a support tab applicator assembly and a support tab finisher assembly, showing strengthening film applied by a strengthening film applicator assembly, and showing holes cut through the sheet material by a hole punch assembly of the exemplary banner making machine of FIG. 1.

The flattening portion 216 includes a roller 222 coupled to a roller actuator 224. The roller actuator 224 is actuated to advance the roller 222 towards the sheet material 22, where the sheet material 22 moves between the roller 222 and the table 44. During advancing and retracting of the punch portion 214 through the materials, edges of the materials forming the hole may become raised, such as out of the sheet plane of the sheet material. Activation of the flattening portion 216 engages these edges and flattens them, moving them substantially into the sheet plane, thereby helping to prevent tears and/or wrinkles in the final end product. FIG. 35 depicts the final end product separate from the machine 20, and showing holes extending through each of the sheet material 22, support tabs 82 and strengthening film 160.

In some embodiments, the hole punch assembly 54 may be configured to apply grommets to the sheet material, where the application of the grommet causes a hole to be punched through the sheet material. In such case, the hole punch assembly 54 may include a supply portion that stores grommets, and the punch portion 214 may be configured to both apply a grommet an punch a hole substantially simultaneously.

It is noted that in the described embodiment, the automated assemblies are fixed to the frame 40 and/or the table 44. The sheet material 22 is advanced to align specific locations of the sheet material 22 with the automated assemblies. In other embodiments, the automated assemblies may be movably coupled to the table 44 and/or the frame 40. For example, the table 44 may be configured to translate one or more of the support tab applicator assembly 50, the support tab finisher assembly 52, the hole punch assembly 54, and the strengthening film applicator assembly 60. The movement may facilitate alignment of the various automated assemblies with particular application locations of the sheet material 22, such as to enable multiple application steps to take place simultaneously. For example, where a banner includes varied spacings between successive support tabs 82, one or both of the support tab applicator assembly 50 and the support tab finisher assembly 52 may translate relative to one another and relative to the table 44. The translation may allow alignment of the automated assemblies with application locations of the sheet material 22 to enable simultaneous applications of first portions 84 and second portions 86 of the support tabs, for example.

In some embodiments, the machine 20 may include a supply portion for storing sheet material to be modified. The supply portion may include shelves for storing sheet material of discrete lengths. Alternatively the supply portion may include a roll mechanism for storing a roll of sheet material to be fed onto the table 44 for modification. In such case, the machine 20 may include a sheet material severing assembly disposed at the front side 26 or rear side 28 of the frame 40 for separating discrete lengths of sheet material from the roll. The severing assembly may be communicatively connected to the controller 72 for determining precise timing of the severing function of the severing assembly.

Figure 36:
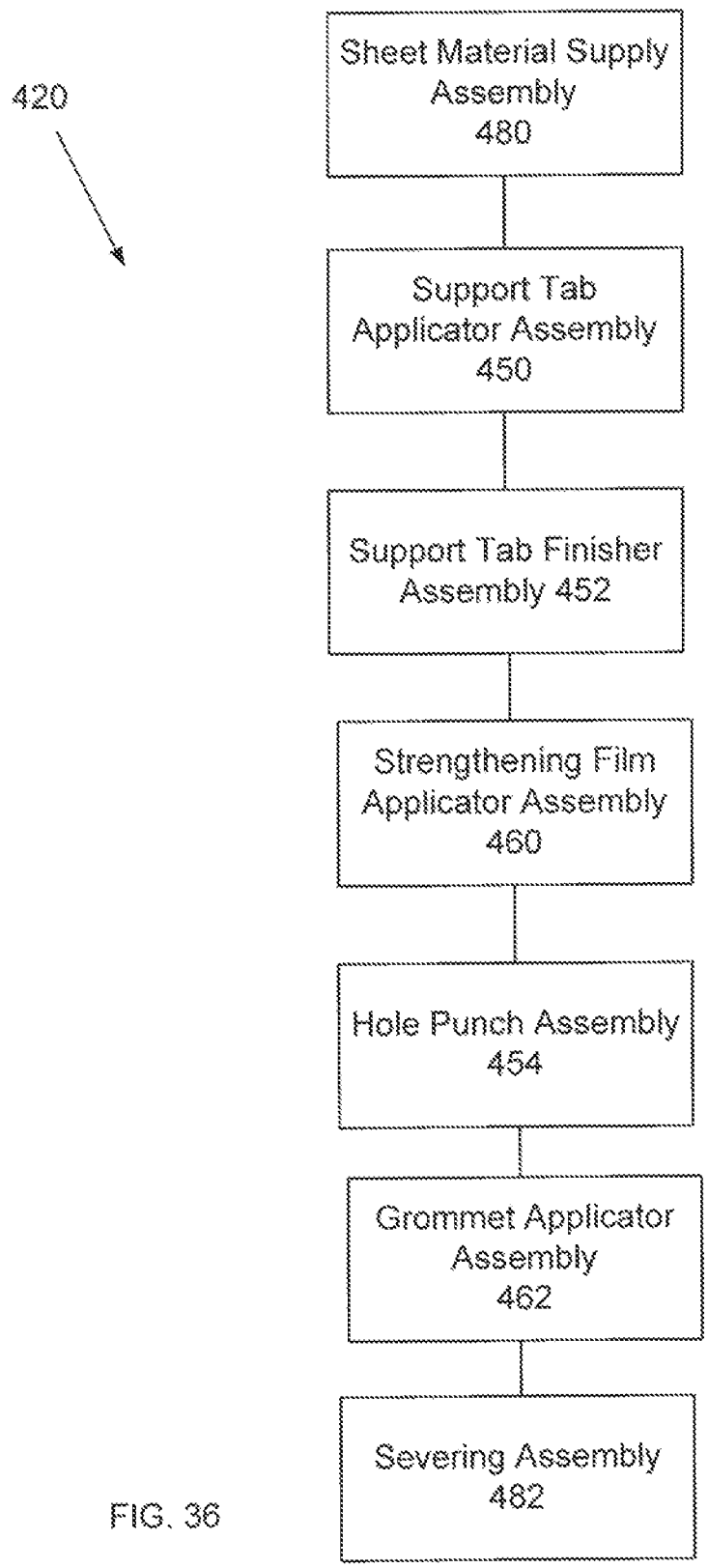
FIG. 36 is a schematic view of another exemplary banner making machine provided in accordance with the present invention.

Turning now to FIG. 36, another exemplary embodiment of a banner making machine is schematically depicted at 420. The banner making machine 420 is substantially the same as the above-referenced banner making machine 20, and consequently the same reference numerals, indexed by 400, are used to denote structures corresponding to similar structures in the banner making machine 420. In addition, the foregoing description of the banner making 20 is equally applicable to the banner making machine 420 except as noted below. Moreover, aspects of the banner making machines 20 and 420 may be substituted for one another or used in conjunction with one another where applicable.

The banner making machine 420 includes one or more support tab applicator assemblies 450, one or more support tab finisher assemblies 452, one or more hole punch assemblies 454, and one or more strengthening film applicator assemblies 460. As shown, the banner making machine 420 may include one or more grommet applicator assemblies 462 to apply grommets to the sheet material in addition to or as an alternative to any of strengthening film and/or support tabs.

A sheet material supply assembly 480 is disposed upstream of the other assemblies. The supply assembly 480 may include discrete lengths of sheet material, or alternatively may include a supply of sheet material that is not yet cut into discrete lengths. In such case, the sheet material may be supplied on a roll or in one or more fan-folded stacks. The supply assembly 480 may include a table, rack, or roll device for storing and dispensing the sheet material.

Further, a severing assembly 482 is disposed downstream of the other assemblies. The severing assembly 482 is configured to separate the sheet material into discrete lengths after application of one or more of support tabs, strengthening film, and/or grommets.

In some embodiments the assemblies of the banner making machine 420 may be arranged in any suitable order, being upstream and downstream from one another in any suitable arrangement. In some embodiments, one or more of the assemblies may be omitted and/or one or more of the assemblies may not be used.

In summary, a machine 20 for applying support members 82 to opposing sides of opposing edges of a sheet material 22 includes a support tab applicator assembly 50 that applies a first portion 84 of a support tab 82 along a longitudinal edge of a first side of the sheet material 22, a support tab finisher assembly 52 that applies a second portion 86 of the support tab 82 disposed opposite the first portion 84 to a second side of the sheet material 22 disposed opposite the first side, and a hole punch assembly 54 that cuts a hole through at least the sheet material 22. The machine 20 also may include a strengthening film applicator assembly 60 that applies a strengthening film 160 along a longitudinal length of the first side of the sheet material 22 and/or across the support tab 82.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A machine for applying support tabs to a sheet material, the machine comprising:
   a support table that supports a longitudinal edge of a longitudinal length of the sheet material during tab application;
   a support tab applicator assembly that engages a first side of a sheet material along the longitudinal length of the sheet material to apply a first portion of a support tab thereto, the support tab being configured to receive a suspension member;
   a support tab finisher assembly that engages the sheet material along the longitudinal length to apply a second portion of the support tab to a second side of the sheet material opposite the first portion of the support tab, the finisher assembly including a press plate, that moves to engage the first side of the sheet material between the press plate and the support table, and a pressure support, that engages the second side of the sheet material, wherein a full longitudinal length of the sheet material to which the support tab applicator assembly applies the first portion of the support tab is thereby clamped between the press plate and the pressure support during application of the second portion; and a hole punch assembly that cuts a hole through the sheet material and through the support tab, the hole for receiving the suspension member.

2. The machine as set forth in claim 1, further including a strengthening film applicator assembly that engages the sheet material and the support tab to apply a strengthening film along the longitudinal length of the sheet material and across the support tab.

3. The machine as set forth in claim 2, wherein the strengthening film applicator assembly includes oppositely disposed members that engage the strengthening film prior to application of the film to the sheet material and that disengage the strengthening film during application of the film to the sheet material.

4. The machine as set forth in claim 2,
wherein the machine has a sheet plane aligned through the sheet material, a bisecting plane aligned orthogonal to the sheet plane and bisecting the longitudinal length of the sheet material, and transverse plane aligned orthogonal to each of the sheet plane and the bisecting plane, and
wherein the machine includes a severing mechanism for severing a length of strengthening film, the blade being disposed in a blade plane aligned at an acute angle to each of the sheet plane and the bisecting plane and aligned orthogonal to the transverse plane.

5. The machine as set forth in claim 1, further including a first support tab applicator and finisher assembly, and first hole punch assembly configured for modifying a first longitudinal edge portion of the sheet material, and a second support tab applicator assembly, second support tab finisher assembly, and second hole punch assembly configured for modifying a second longitudinal edge portion of the sheet material disposed opposite the first longitudinal edge portion.

6. The machine as set forth in claim 1, wherein the support table includes a table edge for supporting the longitudinal edge of the sheet material, and wherein the table edge has extending therethrough a gap for exposing oppositely disposed areas on the first and second sides of the sheet material, thereby allowing the support tab to be applied to the oppositely disposed areas.

7. The machine as set forth in claim 6, wherein the press plate is configured to engage the support table at opposite longitudinal sides of the gap that are spaced apart along the longitudinal length of the sheet material.

8. The machine as set forth in claim 1, further including a controller configured to recognize a longitudinal location of the support tab applied to the first side of the sheet material along the longitudinal length of the sheet material.

9. The machine as set forth in claim 1, further including a sheet material advancing assembly including
a grasping portion that grasps a longitudinal edge portion of the longitudinal length of the sheet material, and
a channel along which the grasping portion moves to advance the sheet material along the machine.

10. The machine as set forth in claim 1, wherein the support tab applicator assembly includes a selectively retractable support tab dispenser that dispenses the support tab and advances the support tab towards the first side of the sheet material.

11. The machine as set forth in claim 1, wherein the support tab finisher assembly includes
a first actuator that pushes the second portion of the support tab into a nonplanar position relative to the sheet material, and
a second actuator that pushes the second portion of the support tab from the nonplanar position to a final position applied to the second side of the sheet material where the first portion is arranged substantially parallel the second portion in the final position.

12. The machine as set forth in claim 1,
wherein the pressure support is a retractable pressure support that is configured to retract, disengaging it from the sheet material during application of the second portion of the support tab to the second side of the sheet material.

13. A machine as set forth in claim 1, wherein the support tab applicator assembly includes a roll mechanism that receives a roll of support tabs.

14. A machine as set forth in claim 13, wherein the roll mechanism includes the roll of support tabs wound about a center axis.

15. A machine as set forth in claim 1, wherein the hole punch assembly is configured to apply a grommet to the sheet material, and wherein the application of the grommet causes a hole to be punched through the sheet material and through the support tab.

16. A machine for applying tab supports to a sheet material, the machine comprising:
a support tab placement assembly that engages a first side of a sheet material along a longitudinal length of the sheet material to apply a first portion of a support tab thereto, the support tab for receiving a suspension member;
the support tab placement assembly further applying a second portion of the support tab to an opposite side portion at the second side of the sheet material along the longitudinal length opposite the first portion of the support tab applied to the first side of the sheet material,
the support tab placement assembly including a retractable pressure support engaging an opposite side portion of the second side to which the second portion of the support tab is to be applied and a press plate that moves toward and engages the first side of the sheet material disposed opposite the opposite side portion, wherein the press plate and the retractable pressure support stabilizing clamp the sheet material and the first portion of the support tab therebetween prior to application of the second portion of the support tab, and wherein the retractable pressure support is configured to retract in a direction outwardly from the sheet material disengaging it from the sheet material during the application of the second portion of the support tab to the opposite side portion to allow for engagement of the second portion of the support tab with the opposite side portion; and
a hole punch disposed downstream of the support tab placement assembly that punches a hole through a portion of the sheet material enclosed by the support tab, thereby creating a hole for receiving the suspension member for suspending the sheet material.

17. A machine as set forth in claim 16, further including a strengthening film dispenser that applies a strengthening film along the sheet material and across the support tab, wherein the strengthening film dispenser is disposed downstream of the support tab placement assembly.

18. A machine as set forth in claim 17, wherein the strengthening film dispenser is disposed upstream of the hole punch.

19. A machine as set forth in claim 16, wherein the support tab placement assembly and hole punch are disposed along a first side of the machine and are configured to modify a first longitudinal edge portion of the sheet material, and wherein the machine further includes a second support tab placement assembly and second hole punch disposed along a second side of the machine disposed opposite the first side and are configured to modify a second longitudinal edge portion of the sheet material disposed opposite the first longitudinal edge portion.

20. A machine as set forth claim 16, further including
a grasping portion that grasps the sheet material, and
a channel along which the grasping portion translates along a direction parallel to the longitudinal length of the sheet material, wherein the grasping portion moves between the support tab placement assembly and the hole punch.

21. The machine as set forth in claim 16, wherein the press plate is configured to engage a full longitudinal length of the first portion of the support tab extending along the longitudinal length of the sheet material.

* * * * *